United States Patent
Tsai et al.

(10) Patent No.: US 10,700,716 B2
(45) Date of Patent: Jun. 30, 2020

(54) WIRELESS COMMUNICATION DEVICE

(71) Applicant: HTC CORPORATION, Taoyuan (TW)

(72) Inventors: Tiao-Hsing Tsai, Taoyuan (TW);
Chien-Pin Chiu, Taoyuan (TW);
Hsiao-Wei Wu, Taoyuan (TW);
Yi-Hsiang Kung, Taoyuan (TW);
Shen-Fu Tzeng, Taoyuan (TW);
Li-Yuan Fang, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 16/239,710

(22) Filed: Jan. 4, 2019

(65) Prior Publication Data

US 2019/0140671 A1    May 9, 2019

Related U.S. Application Data

(60) Continuation of application No. 16/139,107, filed on Sep. 24, 2018, now Pat. No. 10,211,858, which is a
(Continued)

(51) Int. Cl.
*H04B 1/38* (2015.01)
*H04B 1/00* (2006.01)
(Continued)

(52) U.S. Cl.
CPC .............. *H04B 1/006* (2013.01); *H01Q 1/243* (2013.01); *H01Q 5/328* (2015.01); *H01Q 5/35* (2015.01);
(Continued)

(58) Field of Classification Search
CPC ...... H04B 1/0053; H04B 1/0064; H01Q 1/00; H01Q 5/00
See application file for complete search history.

(56) References Cited

U.S. PATENT DOCUMENTS 10,158,381 B2 * 12/2018 Tsai .................. H04B 1/006
2012/0001815 A1 * 1/2012 Wong ................ H01Q 1/243
343/749
(Continued)

FOREIGN PATENT DOCUMENTS

CN    200986965 A    12/2007
CN    101335375 A    12/2008
(Continued)

OTHER PUBLICATIONS

Chinese language office action dated Aug. 2, 2019, issued in application No. CN 201711214164.4.
English language translation of Chinese office action.

*Primary Examiner* — Tuan Pham
(74) *Attorney, Agent, or Firm* — McClure, Qualey & Rodack, LLP

(57) ABSTRACT

A wireless communication device is provided. The wireless communication device includes a housing, a circuit board, a radio frequency module and an antenna. The housing has a frame and a back cover to define a receiving space. The circuit board is disposed in the receiving space, and defines a clearance area from the housing in the receiving space. The circuit board includes a ground terminal, a first feeding point, and a second feeding point. The antenna includes at least one metal conductor coupled to the first feeding point and the second feeding point, respectively, to provide a low frequency resonant path, a first middle frequency resonant path, a second middle frequency resonant path and a high frequency resonant path.

14 Claims, 22 Drawing Sheets

Related U.S. Application Data division of application No. 15/821,777, filed on Nov. 23, 2017, now Pat. No. 10,158,381.

(60) Provisional application No. 62/428,183, filed on Nov. 30, 2016.

(51) Int. Cl.
| | |
|---|---|
| *H01Q 5/328* | (2015.01) |
| *H01Q 5/371* | (2015.01) |
| *H01Q 1/24* | (2006.01) |
| *H01Q 5/35* | (2015.01) |
| *H04B 1/40* | (2015.01) |
| *H04W 88/06* | (2009.01) |

(52) U.S. Cl.
CPC .............. *H01Q 5/371* (2015.01); *H04B 1/40* (2013.01); *H04W 88/06* (2013.01)

(56) References Cited

U.S. PATENT DOCUMENTS

| | | |
|---|---|---|
| 2013/0027254 A1 | 1/2013 | Korva et al. |
| 2013/0063313 A1* | 3/2013 | Ban ..................... H01Q 13/106 |
| | | 343/700 MS |
| 2014/0184465 A9* | 7/2014 | Uejima .................. H01Q 9/14 |
| | | 343/850 |

FOREIGN PATENT DOCUMENTS

| | | |
|---|---|---|
| CN | 101388494 A | 3/2009 |
| CN | 101662067 A | 3/2010 |
| CN | 203721879 A | 7/2014 |

\* cited by examiner

WIRELESS COMMUNICATION DEVICE

CROSS-REFERENCES TO RELATED APPLICATIONS

This application is a Continuation Application of U.S. application Ser. No. 16/139,107 filed Sep. 24, 2018, now U.S. Pat. No. 10,211,858, which is a Divisional Application of U.S. application Ser. No. 15/821,777 filed Nov. 23, 2017, now U.S. Pat. No. 10,158,381 issued on Dec. 18, 2018, which claims priority to U.S. Provisional Application Ser. No. 62/428,183 filed on Nov. 30, 2016, all of which are hereby incorporated by reference in their entireties.

BACKGROUND OF THE INVENTION

Field of the Invention

The present invention relates to a wireless communication device. More particularly, the wireless communication device of the present invention has an antenna operating in multiple frequency bands at the same time so as to support the carrier aggregation (CA) technology.

Descriptions of the Related Art

With the vigorous development of wireless communication industries, the demands for wireless transmission data amount are increasing day by day. To meet the demands of users, a rapid wireless transmission speed is necessary. Therefore, the mainstream fourth generation of mobile communication systems (e.g., the LTE mobile communication system) adopts the CA technology to simultaneously receive data on multiple frequency bands via the antenna to increas the transmission speed.

However, in consideration of the pleasant appearance and the size of wireless communication devices (particularly, mobile phones), an urgent need exists in the art to provide a multi-band antenna within a complicated and small receiving space of the housing and combine the antenna with a metal frame.

SUMMARY OF THE INVENTION

The present invention provides an antenna design with multiple feeding sources, which is capable of feeding multiple radio frequency (RF) signal sources to a same antenna physical structure to share an antenna clearance area and save the space occupied by the antenna within a wireless communication device, and is capable of utilizing a suitable physical structural design to achieve a high isolation and a high radiant efficiency among multiple RF signal resources. Moreover, the antenna design with multiple feeding sources of the present invention may also add active components to optimize impedance matching and increase the real-time adjustability of the operation frequency band.

To achieve the aforesaid objective, the present invention discloses a mobile communication device which comprises a housing, a circuit board, a radio frequency (RF) module and an antenna. The housing has a frame and a back cover to define a receiving space. The circuit board is disposed in the receiving space and defines a clearance area from the housing. The circuit board has a ground terminal, a first feeding point and a second feeding point. The radio frequency (RF) module is disposed on the circuit board and coupled to the first feeding point and the second feeding point. An antenna is disposed in the clearance area and configured to transmit and receive an RF signal. The antenna comprises: a first metal conductor, extending at least toward a lateral direction of the frame and having a first free end and a second free end, the first metal conductor being extendedly coupled from a first extension point between the first free end and the second free end to the first feeding point, the first metal conductor being coupled from a second extension point between the first extension point and the second free end to the ground terminal via a passive component; and a second metal conductor, extending at least toward a longitudinal direction of the frame and having a first endpoint adjacent to the second free end of the first metal conductor and a second endpoint away from the second free end of the first metal conductor, the second metal conductor being extendedly coupled from the first endpoint to the ground terminal and from the second endpoint to the ground terminal respectively, the second metal conductor being coupled from between the first endpoint and the second endpoint to the second feeding point.

Moreover, the present invention further discloses a mobile communication device which comprises a housing, a circuit board, a radio frequency (RF) module and an antenna. The housing has frame and a back cover to define a receiving space. The circuit board is disposed in the receiving space and defines a clearance area from the housing. The circuit board has a ground terminal, a first feeding point and a second feeding point. The radio frequency (RF) module is disposed on the circuit board and coupled to the first feeding point and the second feeding point. An antenna is disposed in the clearance area and configured to transmit and receive an RF signal. The antenna comprises: a metal conductor, extending toward a lateral direction and a longitudinal direction of the frame and having a free end and an endpoint, the metal conductor being extendedly coupled from a first extension point between the free end and the endpoint to the first feeding point, being coupled from a second extension point between the first extension point and the free end via a passive component to the ground terminal, being extendedly coupled from a third extension point between the first extension point and the endpoint to the ground terminal, being coupled from between the third extension point and the endpoint to the second feeding point, and being coupled from the endpoint to the ground terminal.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. However, these embodiments are not intended to limit the present invention to any specific environment, applications or particular implementations described in these embodiments. Therefore, description of these embodiments is only for purpose of illustration rather than to limit the present invention. It should be appreciated that, in the following embodiments and the attached drawings, elements unrelated to the present invention are omitted from depiction; and dimensional scales among individual elements in the attached drawings are provided only for illustration, but not to limit the actual scale.

Figure 1:
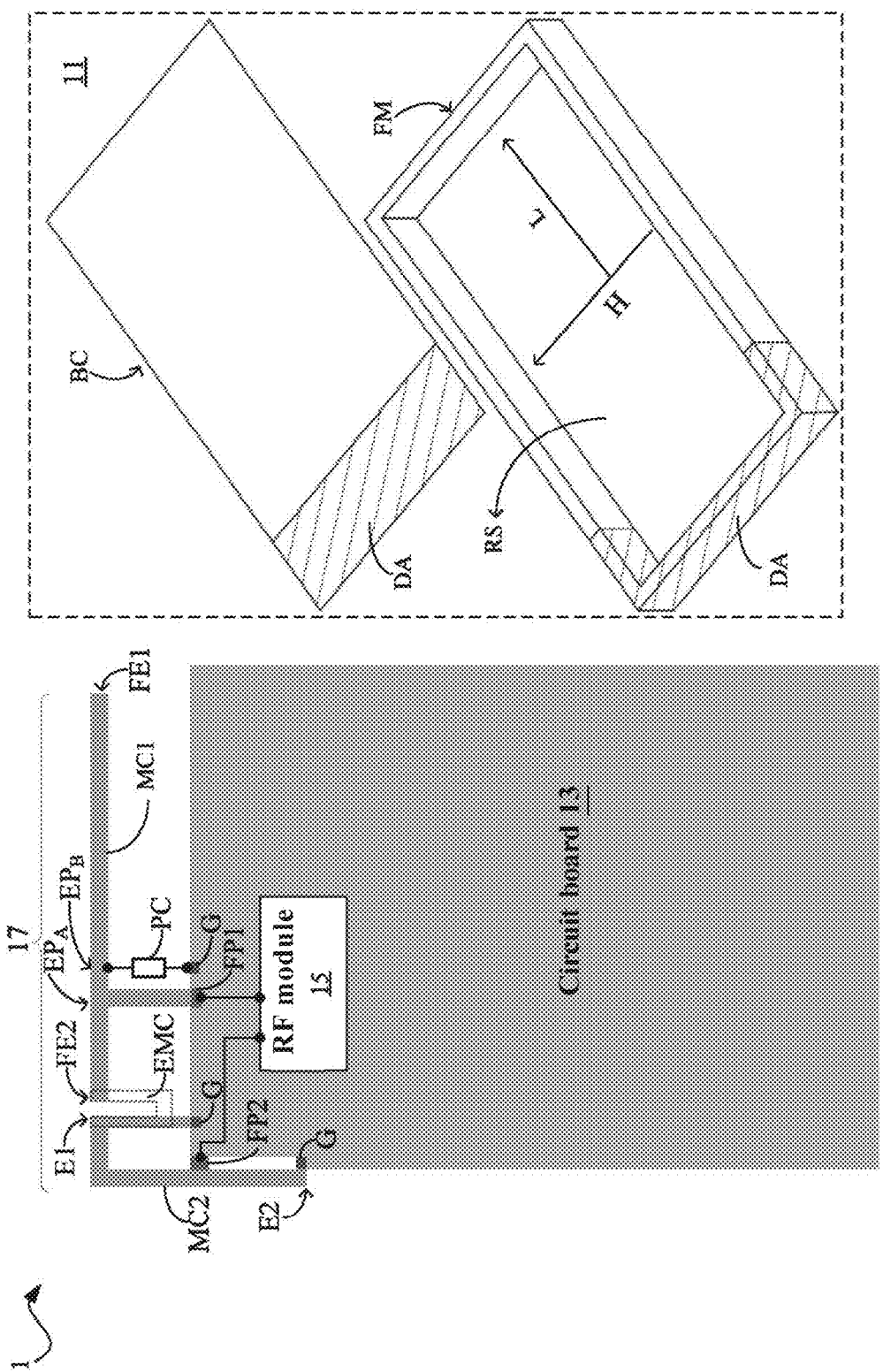
FIG. 1 is a schematic exploded view of a mobile communication device 1 according to a first embodiment of the present invention.

Please refer to FIG. 1 for a first embodiment of the present invention, and FIG. 1 is a schematic exploded view of a mobile communication device 1 of the present invention. The mobile communication device 1 comprises a housing 11, a circuit board 13, a radio frequency (RF) module 15 and an antenna 17. The housing 11 at least comprises a frame FM and a back cover BC to define a receiving space RS. It shall be noted that, based on the principle of simplifying the description, other components of the mobile communication device 1 such as a display module, an image capturing module, a power module, an input module and components irrelevant to the present invention are omitted from depiction in the drawings.

When the circuit board 13 is disposed in the receiving space RS, the circuit board 13 defines a clearance area together with the housing 11 so that the antenna 17 can be disposed within the clearance area, thereby protecting the antenna 17 from interference caused by remaining electronic components on the circuit board 13 or other components of the mobile communication device 1. Moreover, to prevent the housing 11 from influencing characteristics of the antenna 17, the frame FM and a slash part DA of the back cover BC are made of non-metal materials, while the remaining part except for the slash part DA may be made of metal materials or non-metal materials. The clearance area may be an area in the receiving space RS that is not overlapped with the circuit board 13 or further comprises an area that is overlapped with a pure flexible board of the circuit board 13, so the clearance area is generally defined by the frame FM and the slash part DA of the back cover BC. The configuration of the clearance area is known by those of ordinary skill in the art, and thus will not be further described herein. In another embodiment, the antenna 17 may be combined with the frame FM, i.e., at least a part of the frame FM is capable of receiving and transmitting RF signals, and detailed technical contents thereof are as described later.

The circuit board 13 has a ground terminal G, a first feeding point FP1 and a second feeding point FP2. In this embodiment, the first feeding point FP1 is a low/middle frequency feeding point, and the second feeding point FP2 is a high frequency feeding point. The RF module 15 is disposed on the circuit board 13 and coupled to the first feeding point FP1 and the second feeding point FP2. The antenna 17 is disposed in the clearance area and is configured to transmit and receive an RF signal. The antenna 17 comprises a first metal conductor MC1, a second metal conductor MC2 and an extension metal piece EMC. The first metal conductor MC1 and the second metal conductor MC2 may be formed on a surface of a carrier plate in the form of a plane metal layer, while the extension metal piece EMC is formed on the other opposite surface, but it is not limited thereto.

The first metal conductor MC1 extends toward a lateral direction of the frame FM, i.e., the first metal conductor MC1 is located in the lateral direction H of the frame FM when the circuit board 13 and the antenna 17 are disposed in the receiving space RS. The first metal conductor MC1 has a first free end FE1 and a second free end FE2, and the first metal conductor MC1 is extendedly coupled from a first extension point $EP_A$ between the first free end FE1 and the second free end FE2 to the first feeding point FP1, and is coupled from a second extension point $EP_B$ between the first extension point $EP_A$ and the second free end FE2 to the ground terminal G via a passive component PC. Parts of the second metal conductor MC2 extend toward a longitudinal direction of the frame FM and parts of the second metal conductor MC2 extend toward a lateral direction of the frame FM (i.e., the second metal conductor MC2 is located both in the lateral direction H and the longitudinal direction L of the frame FM), and the second metal conductor MC2 has a first endpoint E1 adjacent to the second free end FE2 of the first metal conductor MC1 and a second endpoint E2 away from the second free end FE2 of the first metal conductor MC1.

The second metal conductor MC2 is extendedly coupled from the first endpoint E1 to the ground terminal G and from the second endpoint E2 to the ground terminal G respectively. The second metal conductor MC2 is also coupled from between the first endpoint E1 and the second endpoint E2 to the second feeding point FP2. Moreover, the extension metal piece EMC is disposed on a surface different from a surface on which the first metal conductor MC1 and the second metal conductor MC2 are disposed, and the extension metal piece EMC is coupled between the second free end FE2 of the first metal conductor MC1 and the first endpoint E1 of the second metal conductor MC2 to serve as a connecting bridge between the first metal conductor MC1 and the second metal conductor MC2, thereby extending the resonant path of the antenna 17.

Figure 2A:
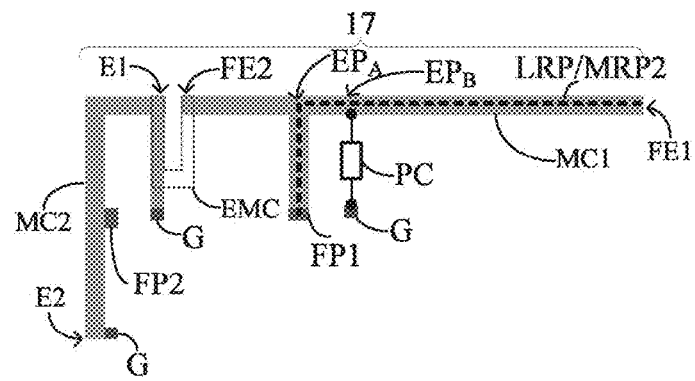
FIG. 2A to FIG. 2C are schematic views illustrating multiple resonant paths according to the first embodiment of the present invention.
Figure 2B:
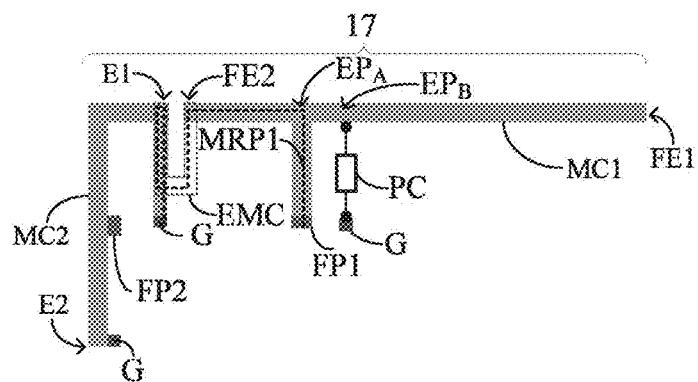
Figure 2C:
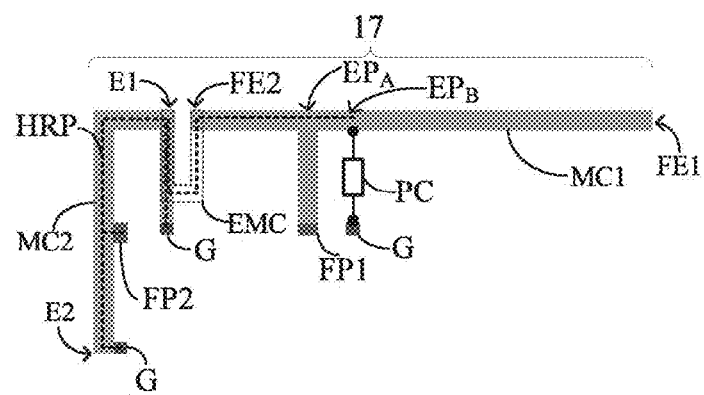

In this way, as shown in FIG. 2A to FIG. 2C, the antenna 17 has a low frequency resonant path LRP from the first feeding point FP1 to the first free end FE1 of the first metal conductor MC1, which is equivalent to a quarter of a wavelength of a low frequency operation frequency (e.g., 700 MHz). Meanwhile, the antenna 17 further has a first middle frequency resonant path MRP1 from the first feeding point FP1 via the extension metal piece EMC to the ground terminal G to which the first endpoint E1 of the second metal conductor MC2 is extendedly coupled, and the first middle frequency resonant path MRP1 is equivalent to a half of a wavelength of a first middle frequency operation frequency (e.g., 1710 MHz). The antenna 17 further has a second middle frequency resonant path MRP2 from the first feeding point FP1 to the first free end FE1 of the first metal conductor MC1, which is equivalent to three quarters of a wavelength of a second middle frequency operation frequency (e.g., 2170 MHz). Moreover, the antenna 17 further has a high frequency resonant path HRP from the second feeding point FP2 to the second endpoint E2 of the second metal conductor MC2, to the ground terminal G to which the first endpoint E1 is extendedly coupled, and via the extension metal piece EMC to the ground terminal G to which the second extension point $EP_B$ of the first metal conductor MC1 is extendedly coupled, and the high frequency resonant path HRP is equivalent to a half of a wavelength of a high frequency operation frequency (e.g., 2300 MHz).

It shall be appreciated that, a passive component PC (e.g., an inductor, a capacitor and any combination thereof) connects the second extension point $EP_B$ of the first metal conductor MC1 and the ground terminal G so as to adjust the high frequency resonant path HRP of the antenna 17. In other embodiments, the present invention may also achieve the purpose of changing the length of the high frequency path via physical winding. Moreover, in other embodiments, the second extension point $EP_B$ may also be disposed at the same position as the first extension point $EP_A$ so that the second extension point $EP_B$ and the first extension point $EP_A$ are overlapped on the first metal conductor.

It shall be appreciated that, through the length design of the resonant paths, the present invention enables the high-frequency signal to regard the first feeding point FP1 as an open end, so the two feeding sources (the first feeding point FP1 and the second feeding point FP2) have a high isolation therebetween and the antenna 17 maintains a good radiation efficiency. The first metal conductor MC1 may be coupled to the first feeding point FP1 via a connector (e.g., a metal elastic piece or a metal screw), and the second metal conductor MC2 may also be coupled to the second feeding point FP2 via a connector (e.g., a metal elastic piece or a metal screw). Similarly, the second metal conductor MC2 may also be coupled to the ground terminal G respectively from the first endpoint E1 and the second endpoint E2 via the connector.

Figure 3A:
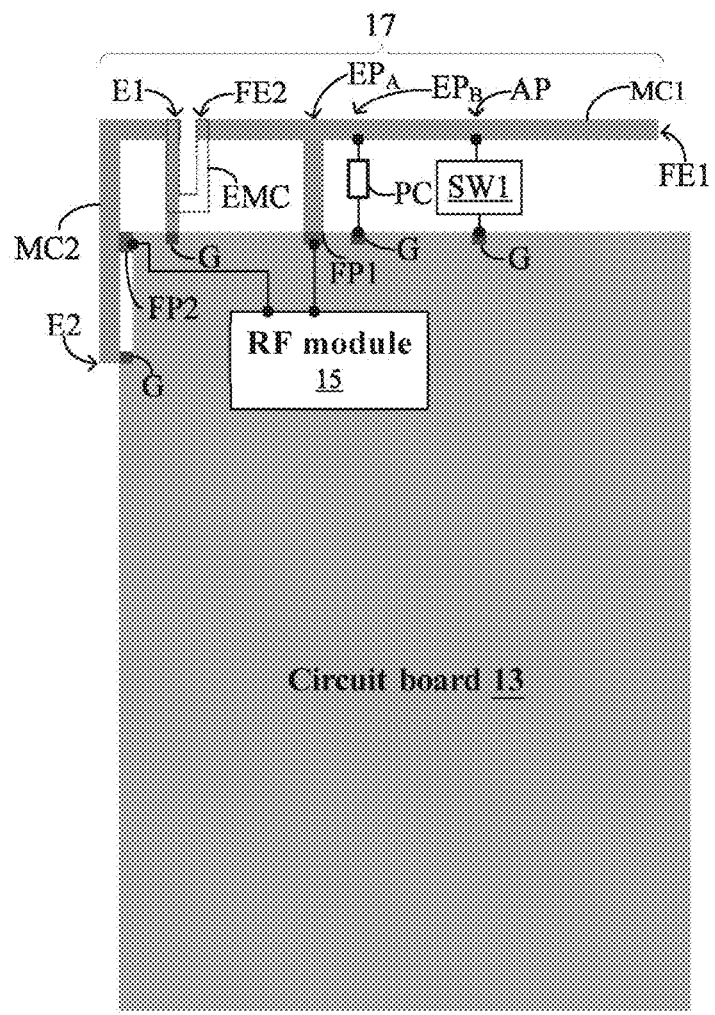
FIG. 3A is a schematic structural view of an antenna comprising a single-pole-four-throw (SP4T) switch SW1 according to a second embodiment of the present invention.
Figure 3B:
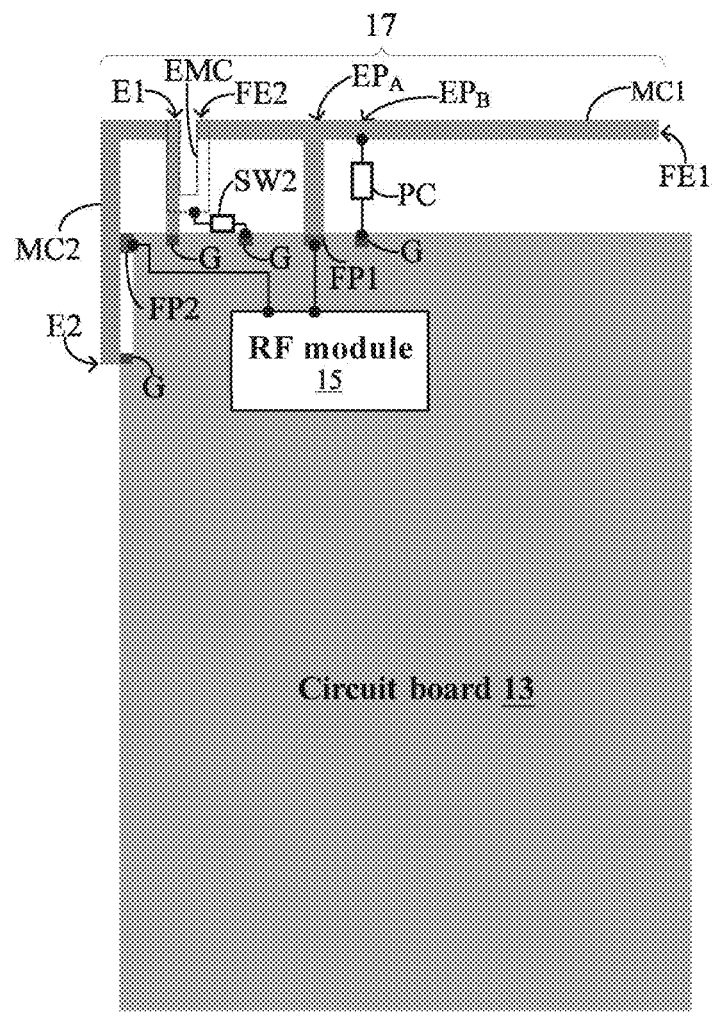
FIG. 3B is a schematic structural view of an antenna comprising a switch SW2 according to the second embodiment of the present invention.
Figure 3C:
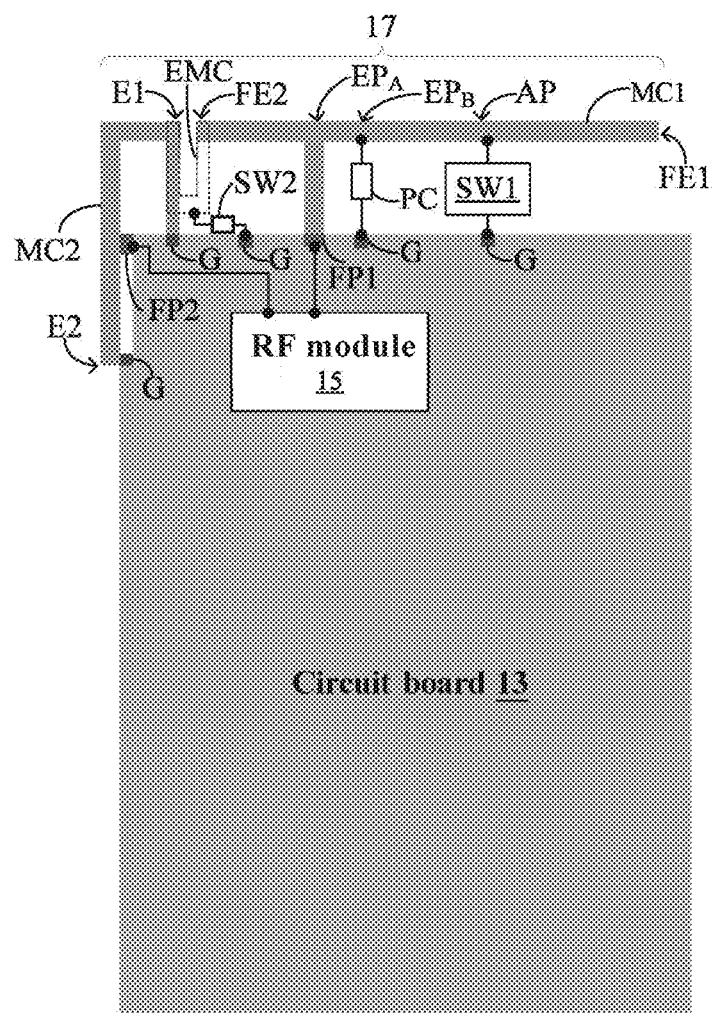
FIG. 3C is a schematic structural view of an antenna comprising both the SP4T switch SW1 and the switch SW2 according to the second embodiment of the present invention.

A second embodiment of the present invention is as shown in FIG. 3A to FIG. 3C. To simplify the description, the housing 11 is omitted in FIG. 3A to FIG. 3C. In the implementation of FIG. 3A, the mobile communication device 1 further comprises a single-pole-four-throw (SP4T) switch SW1 which is configured to selectively couple an adjustment point AP between the first extension point $EP_A$ of the first metal conductor MC1 and the first free end FE1 to the ground terminal G via a passive component (e.g., an inductor) to adjust the low frequency operation frequency and the second middle frequency operation frequency of the antenna 17. Specifically, the SP4T switch SW1 provides four paths for coupling to the ground terminal G, so through connecting a passive component (e.g., an inductor) in series on the four paths, the present invention can make the operation frequency of the antenna (e.g., adjust the low frequency operation frequency from 699 MHz to 960 MHz) adjustable and further improve the impedance matching effect. In an actual application, the inductor connected in series with the SP4T switch SW1 may adopt an inductance of 15 nH.

On the other hand, in the implementation of FIG. 3B, the mobile communication device 1 further comprises a switch SW2 which is configured to selectively couple the extension metal piece EMC to the ground terminal to adjust the first middle frequency operation frequency and the high frequency operation frequency of the antenna 17. Similarly, through connecting a passive component (e.g., an inductor) in series with the switch SW2, the present invention can make the operation frequency of the antenna (e.g., switch the high frequency operation frequency between 2300 MHz and 2700 MHz) adjustable and further improve the impedance matching effect. In an actual application, the inductor connected in series with the switch SW2 may adopt an inductance of 22 nH. Moreover, in the implementation of FIG. 3C, the mobile communication device 1 may comprise both the SP4T switch SW1 and the switch SW2.

Figure 4:
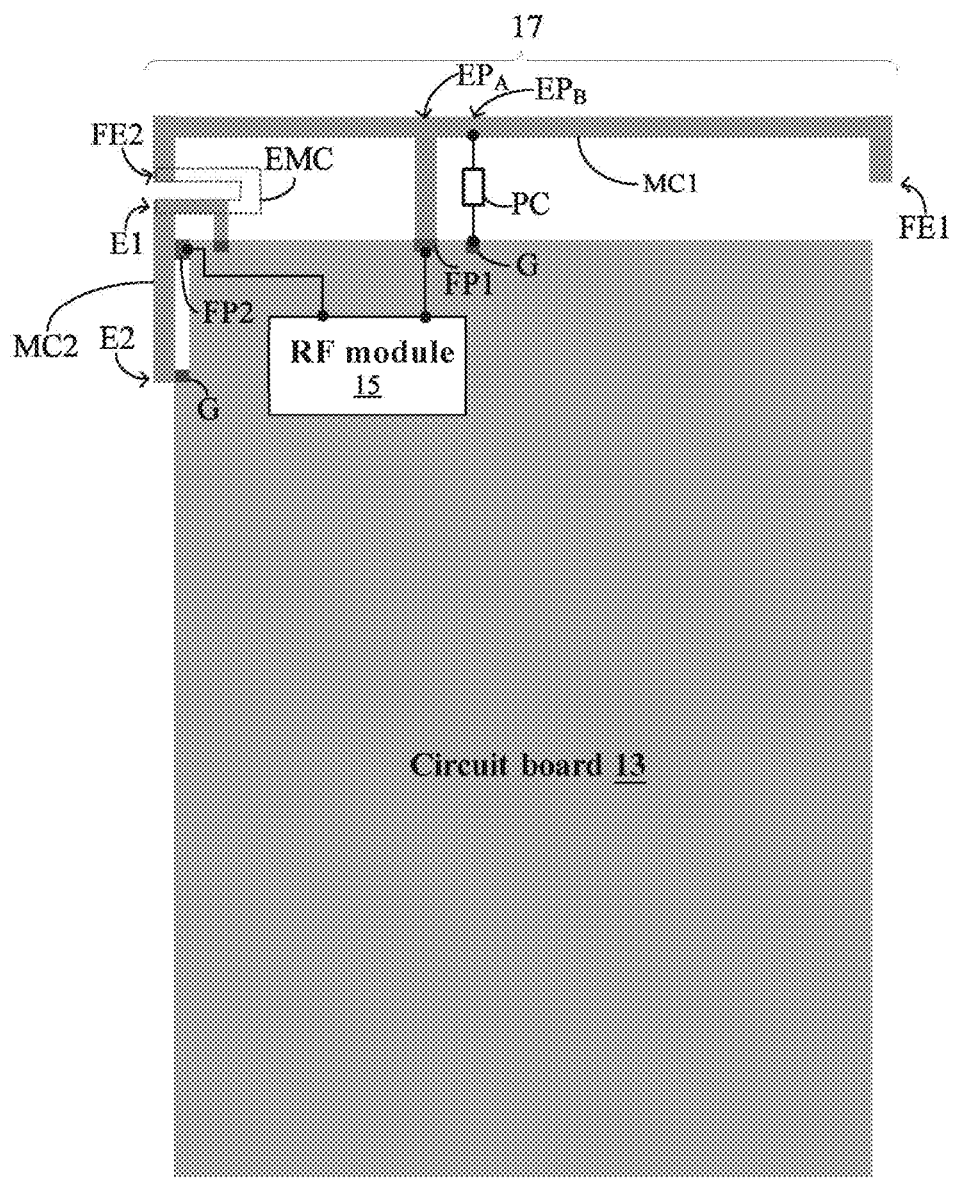
FIG. 4 is a schematic structural view of an antenna according to a third embodiment of the present invention.

Please refer to FIG. 4 for a third embodiment of the present invention. Similarly, to simplify the description, the housing 11 is omitted in FIG. 4, and FIG. 4 only focuses on structural features of the antenna 17. This embodiment differs from the first embodiment in that: the first metal conductor MC1 further extends toward a longitudinal direction of the frame FM in addition to the lateral direction of the frame FM so that the first free end FE1 and the second free end FE2 of the first metal conductor MC1 are located at two longitudinal sides of the frame FM respectively. Moreover, the second metal conductor MC2 only extends toward the longitudinal direction of the frame so that the first endpoint E1 and the second endpoint E2 thereof are all located at a longitudinal side of the frame FM.

Similarly, the extension metal piece EMC is disposed on a surface different from the surface on which the first metal conductor MC1 and the second metal conductor MC2 are disposed, and the extension metal piece EMC is coupled between the second free end FE2 of the first metal conductor MC1 and the first endpoint E1 of the second metal conductor MC2 to serve as a connecting bridge between the first metal conductor MC1 and the second metal conductor MC2, thereby extending the resonant path of the antenna 17.

In this case, the antenna 17 also has a low frequency resonant path from the first feeding point FP1 to the first free end FE1 of the first metal conductor MC1, which is equivalent to a quarter of a wavelength of a low frequency operation frequency (e.g., 700 MHz). Meanwhile, the antenna 17 also has a first middle frequency resonant path from the first feeding point FP1 via the extension metal piece EMC to the ground terminal G to which the first endpoint E1 of the second metal conductor MC2 is extendedly coupled, and the first middle frequency resonant path is equivalent to a half of a wavelength of a first middle frequency operation frequency (e.g., 1710 MHz). The antenna 17 also has a second middle frequency resonant path from the first feeding point FP1 to the first free end FE1 of the first metal conductor MC1, which is equivalent to three quarters of a wavelength of a second middle frequency operation frequency (e.g., 2170 MHz). Moreover, the antenna 17 also has a high frequency resonant path from the second feeding point FP2 to the second endpoint E2 of the second metal conductor MC2, and via the extension metal piece EMC to the ground terminal G to which the second extension point $EP_B$ of the first metal conductor MC1 is extendedly coupled, and the high frequency resonant path is equivalent to a half of a wavelength of a high frequency operation frequency (e.g., 2300 MHz).

It shall be appreciated that, the low frequency resonant path, the first middle frequency resonant path, the second middle frequency resonant path and the high frequency resonant path of the antenna 17 of this embodiment shall be appreciated by those of ordinary skill in the art based on the above descriptions, and thus are omitted from depiction in the drawings. Moreover, as shall also be appreciated by those of ordinary skill in the art, the aforesaid relationships between the resonant paths and the operation frequencies refer to equivalent relationships instead of complete equality in length of physical structures, and the equivalence in length of the structures may be adjusted in combination of other suitable passive components through impedance matching.

Moreover, in other embodiments, the mobile communication device 1 may also add the SP4T switch SW1 and/or the switch SW2 to the antenna 17 so that the operation frequency of the antenna is adjustable and the impedance matching effect is further improved, as described in the second embodiment. The implementation where the SP4T switch SW1 and/or the switch SW2 is added shall be readily appreciated by those of ordinary skill in the art, and thus will not be further described herein.

Figure 5:
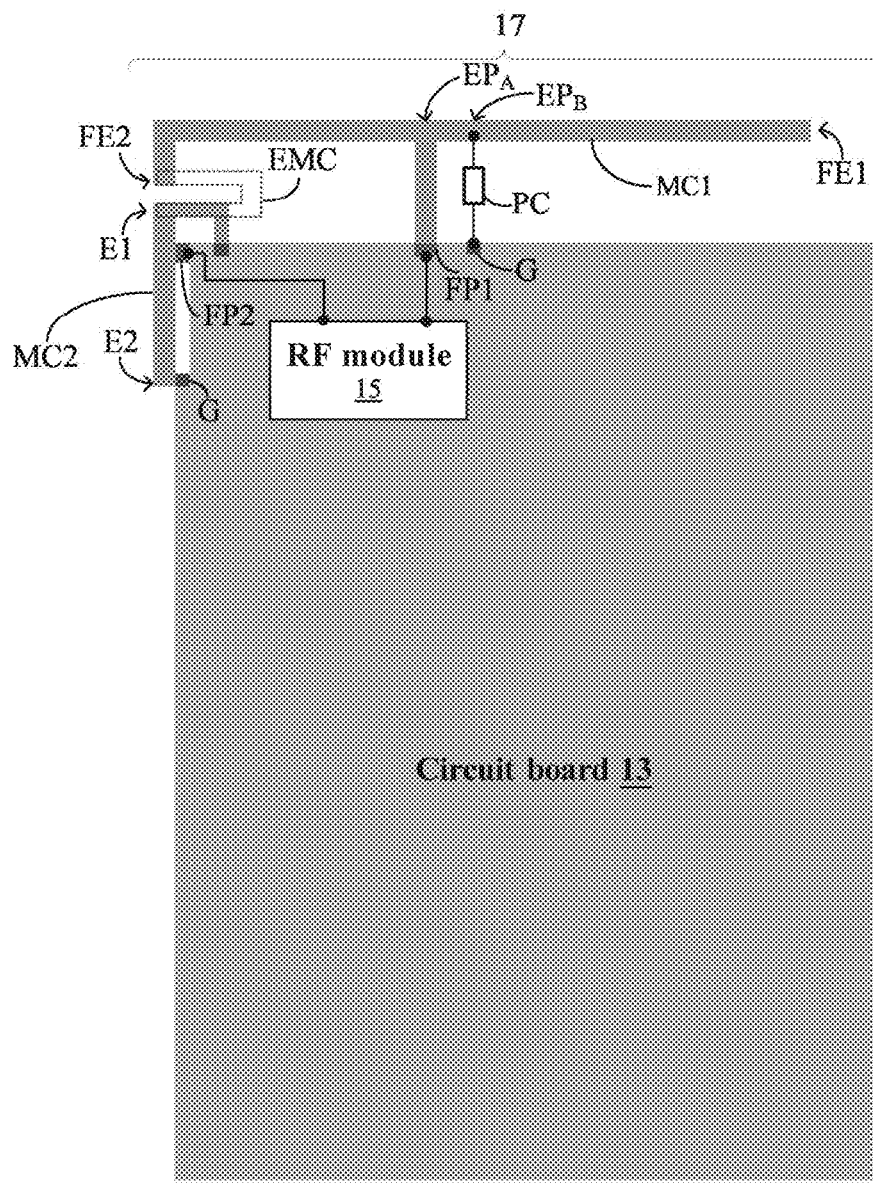
FIG. 5 is a schematic structural view of an antenna according to a fourth embodiment of the present invention.

Please refer to FIG. 5 for a fourth embodiment of the present invention. Similarly, to simplify the description, the housing 11 is omitted in FIG. 5, and FIG. 5 only focuses on structural features of the antenna 17. This embodiment differs from the first embodiment in that: the first metal conductor MC1 further extends toward a longitudinal direction of the frame FM in addition to the lateral direction of the frame FM so that the first free end FE1 of the first metal conductor MC1 is located at a lateral side of the frame FM while the second free end EF2 is located at a longitudinal side of the frame FM. Moreover, the second metal conductor MC2 only extends toward the longitudinal direction of the frame so that the first endpoint E1 and the second endpoint E2 thereof are all located at a longitudinal side of the frame FM.

Similarly, the antenna 17 of this embodiment also has the low frequency resonant path, the first middle frequency resonant path, the second middle frequency resonant path and the high frequency resonant path. These resonant paths shall be appreciated by those of ordinary skill in the art based on the description of the aforesaid embodiments, and thus are omitted from depiction in the drawings. Moreover, the mobile communication device 1 of this embodiment may also add the SP4T switch SW1 and/or the switch SW2 to the antenna 17 so that the operation frequency of the antenna is adjustable and the impedance matching effect is further improved, as described in the second embodiment.

Figure 6:
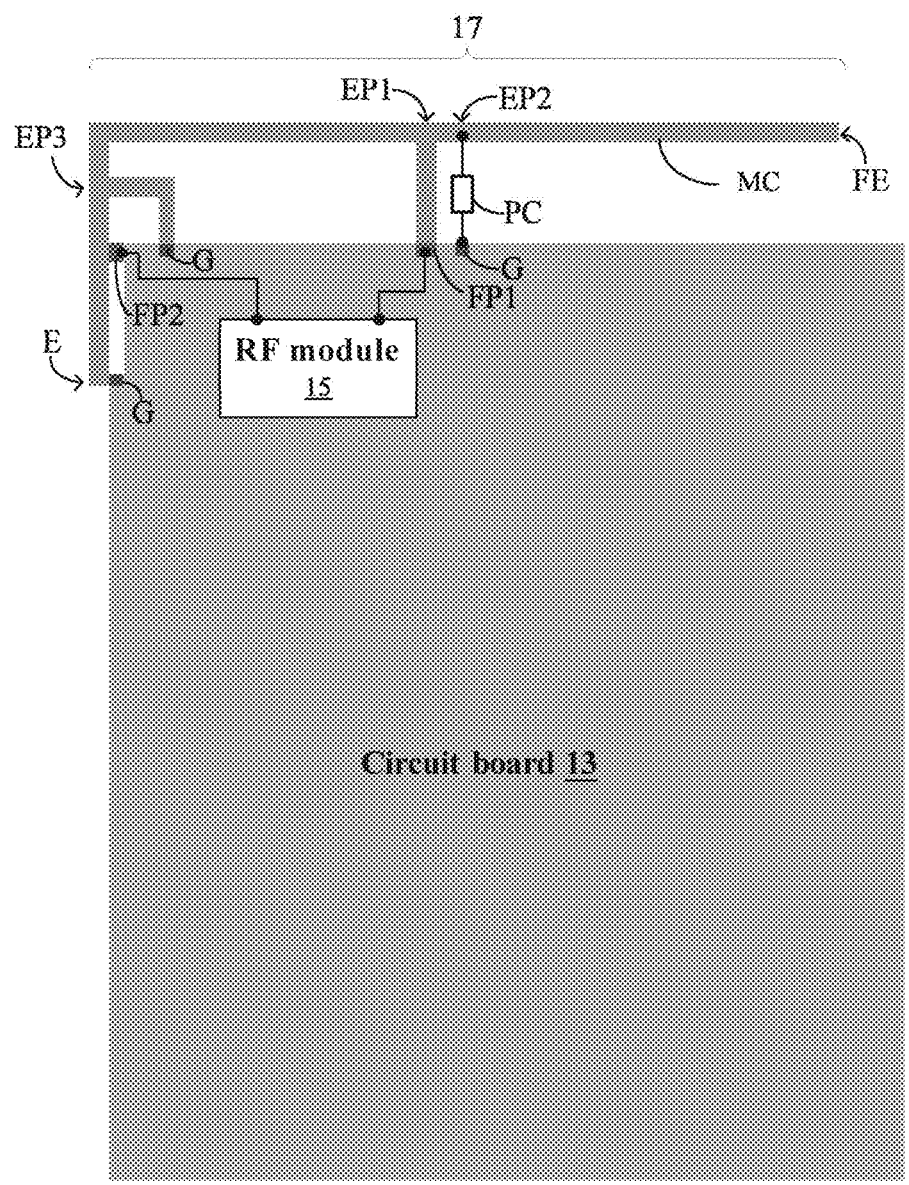
FIG. 6 is a schematic structural view of an antenna according to a fifth embodiment of the present invention.

Please refer to FIG. 6 for a fifth embodiment of the present invention. Similarly, to simplify the description, the housing 11 is omitted in FIG. 6, and FIG. 6 only focuses on structural features of the antenna 17. This embodiment differs from the aforesaid embodiments in that: the antenna 17 of this embodiment is adapted for use in the wireless communication device 1 of a larger size, so the wireless communication device 1 of this embodiment has a larger receiving space RS in which the circuit board 13 and the antenna 17 are provided, and the extension metal piece EMC is not required to extend the resonant path of the antenna 17.

Specifically, the antenna 17 of this embodiment comprises a metal conductor MC which extends toward both a lateral direction and a longitudinal direction of the frame. The metal conductor MC has a free end FE and an endpoint E. The metal conductor MC is extendedly coupled from a first extension point EP1 between the free end FE and the endpoint E to the first feeding point FP1, coupled from a second extension point EP2 between the first extension point EP1 and the free end FE via a passive component PC to the ground terminal G, and is extendedly coupled from a third extension point EP3 between the first extension point EP1 and the endpoint E to the ground terminal G. Moreover, the metal conductor MC is coupled from between the third extension point EP3 and the endpoint E to the second feeding point FP2, and is coupled from the endpoint E to the ground terminal G.

Figure 7A:
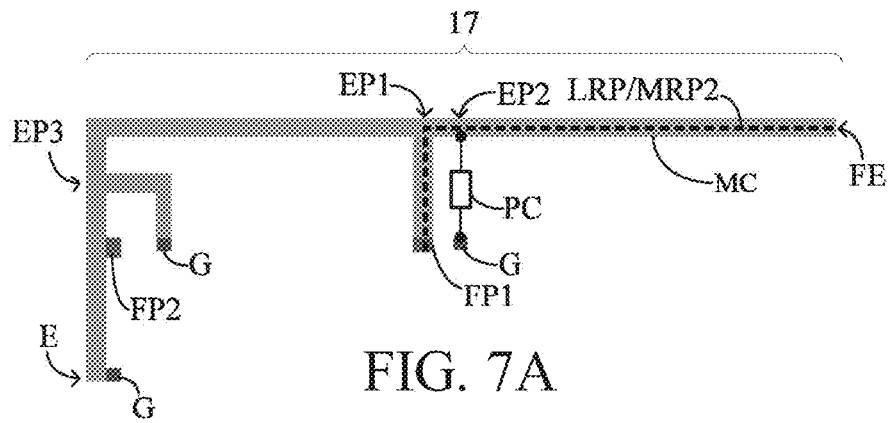
FIG. 7A to FIG. 7C are schematic views illustrating multiple resonant paths according to the fifth embodiment of the present invention.
Figure 7B:
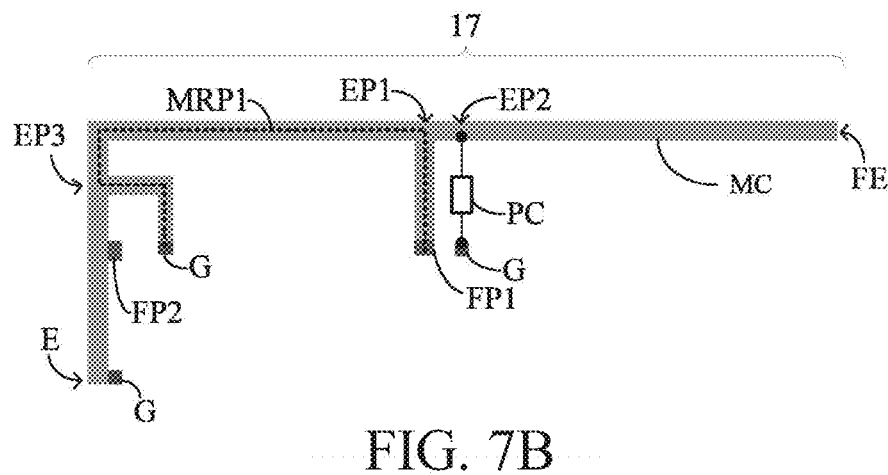
Figure 7C:
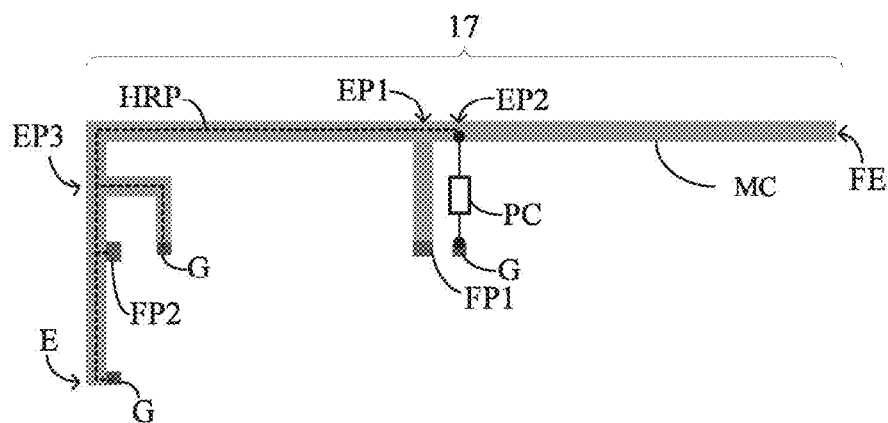

In this way, as shown in FIG. 7A to FIG. 7C, the antenna 17 has the low frequency resonant path LRP from the first feeding point FP1 to the free end FE of the metal conductor MC, which is equivalent to a quarter of a wavelength of a low frequency operation frequency (e.g., 700 MHz). Meanwhile, the antenna 17 also has the first middle frequency resonant path MRP1 from the first feeding point FP1 to the ground terminal G to which the third extension point EP3 is extendedly coupled, and the first middle frequency resonant path MRP1 is equivalent to a half of a wavelength of a first middle frequency operation frequency (e.g., 1710 MHz). The antenna 17 also has the second middle frequency resonant path MRP2 from the first feeding point FP1 to the free end FE of the metal conductor MC, which is equivalent to three quarters of a wavelength of a second middle frequency operation frequency (e.g., 2170 MHz). Moreover, the antenna 17 also has the high frequency resonant path HRP from the second feeding point FP2 to the endpoint E of the metal conductor MC, to the ground terminal G to which the third extension point EP3 is extendedly coupled, and to the ground terminal G to which the second extension point EP2 is extendedly coupled, and the high frequency resonant path HRP is equivalent to a half of a wavelength of a high frequency operation frequency (e.g., 2300 MHz).

Similarly, a passive component PC (e.g., an inductor, a capacitor and any combination thereof) connects the second extension point EP2 of the metal conductor MC1 and the ground terminal G so as to adjust the high frequency resonant path HRP of the antenna 17. In other embodiments, the present invention may also achieve the purpose of changing the length of the high frequency path via physical winding. Moreover, in other embodiments, the first extension point EP1 may also be disposed at the same position as the second extension point EP2 so that the extension point EP1 and the extension point EP2 are overlapped on the metal conductor MC.

Figure 8A:
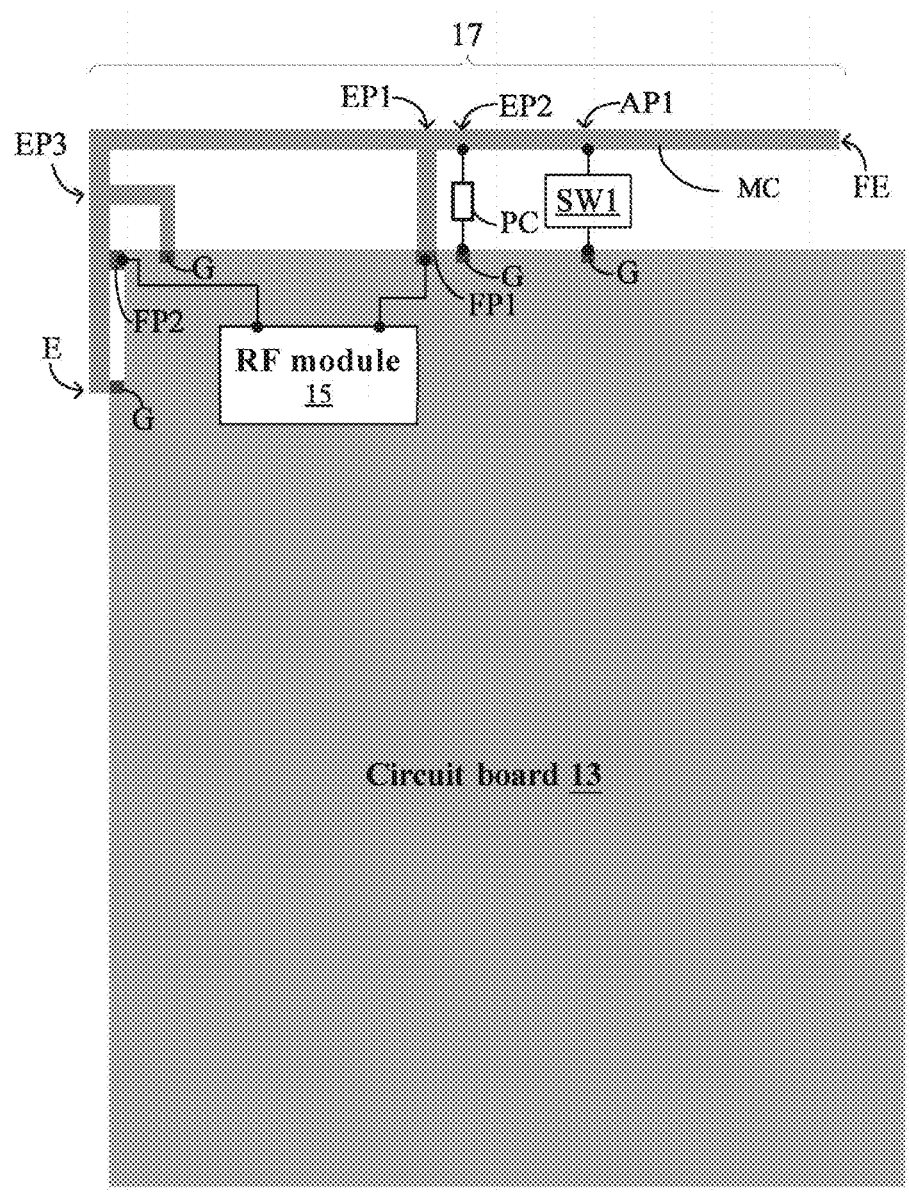
FIG. 8A is a schematic structural view of an antenna comprising the SP4T switch SW1 according to a sixth embodiment of the present invention.
Figure 8B:
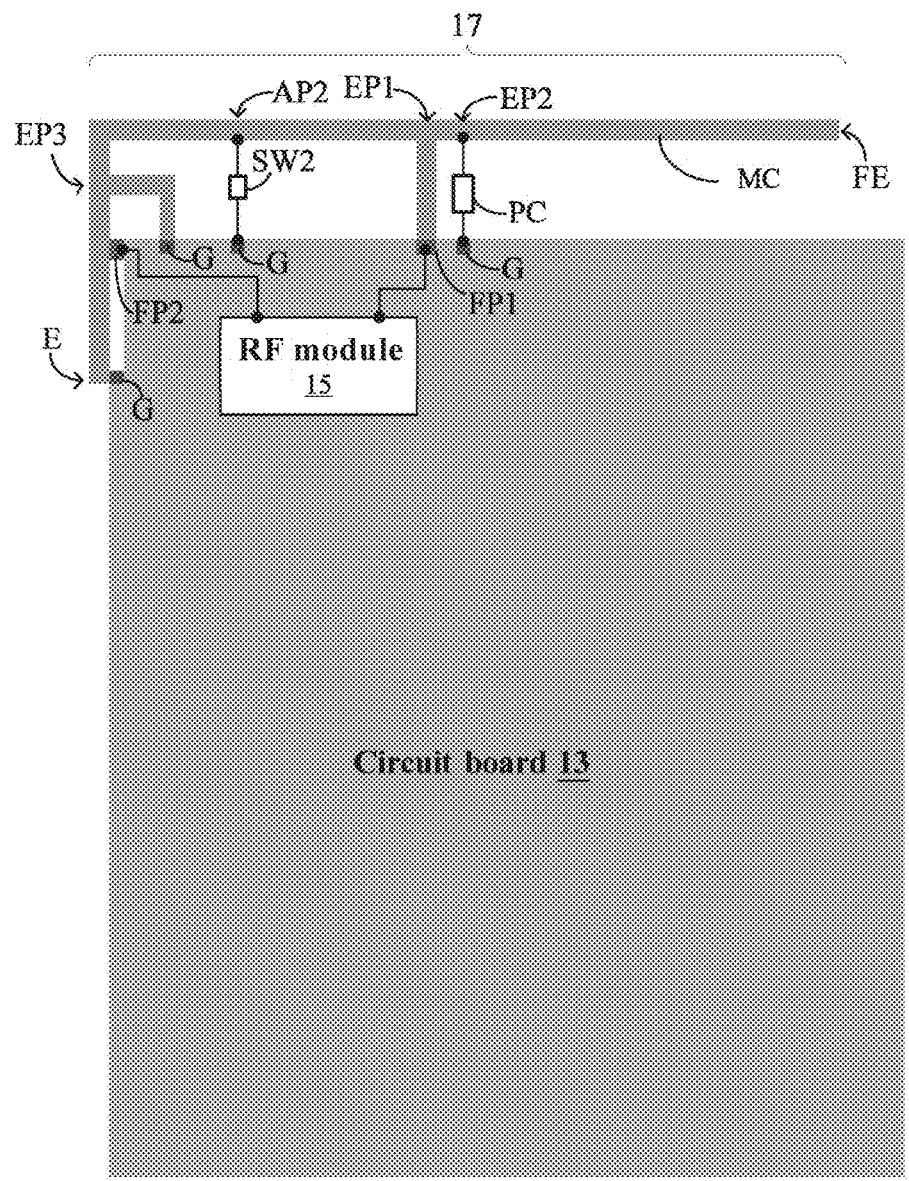
FIG. 8B is a schematic structural view of an antenna comprising the switch SW2 according to the sixth embodiment of the present invention.
Figure 8C:
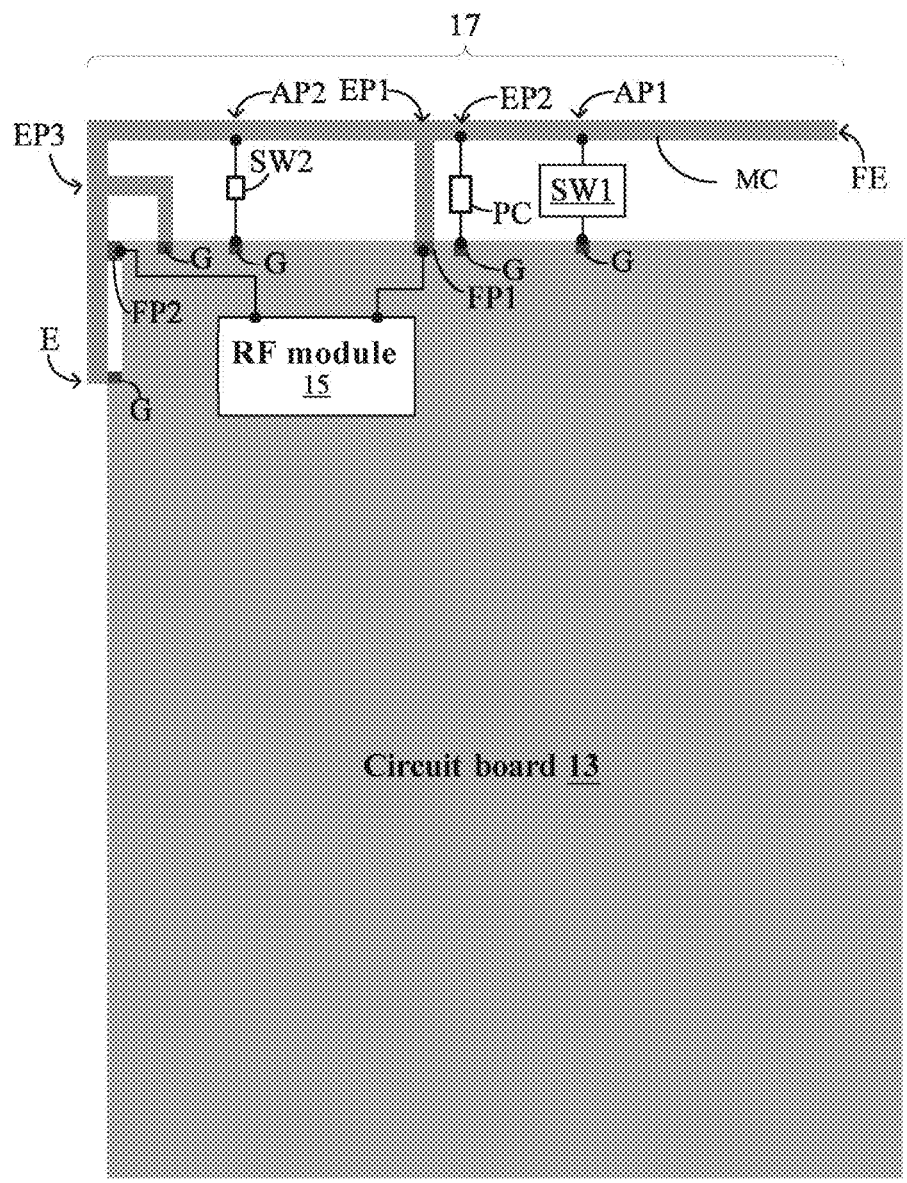
FIG. 8C is a schematic structural view of an antenna comprising both the SP4T switch SW1 and the switch SW2 according to the sixth embodiment of the present invention.

A sixth embodiment of the present invention is as shown in FIG. 8A to FIG. 8C. To simplify the description, the housing 11 is omitted in FIG. 8A to FIG. 8C. Similar to the second embodiment, the mobile communication device 1 of this embodiment may also add the SP4T switch SW1 and the switch SW2 to the antenna 17 of the fifth embodiment. In the implementation of FIG. 8A, the SP4T switch SW1 is configured to selectively couple an adjustment point AP1 between the first extension point EP1 of the metal conductor MC and the free end FE to the ground terminal G via a passive component (e.g., an inductor) to adjust the low frequency operation frequency and the second middle frequency operation frequency.

On the other hand, in the implementation of FIG. 8B, the switch SW2 is configured to selectively couple an adjustment point AP2 between the first extension point EP1 of the metal conductor MC and the third extension point EP3 to the ground terminal G via a passive component (e.g., an inductor) to adjust the first middle frequency operation frequency and the high frequency operation frequency. Similarly, in the implementation of FIG. 8C, the mobile communication device 1 comprises both the SP4T switch SW1 and the switch SW2.

Figure 9:
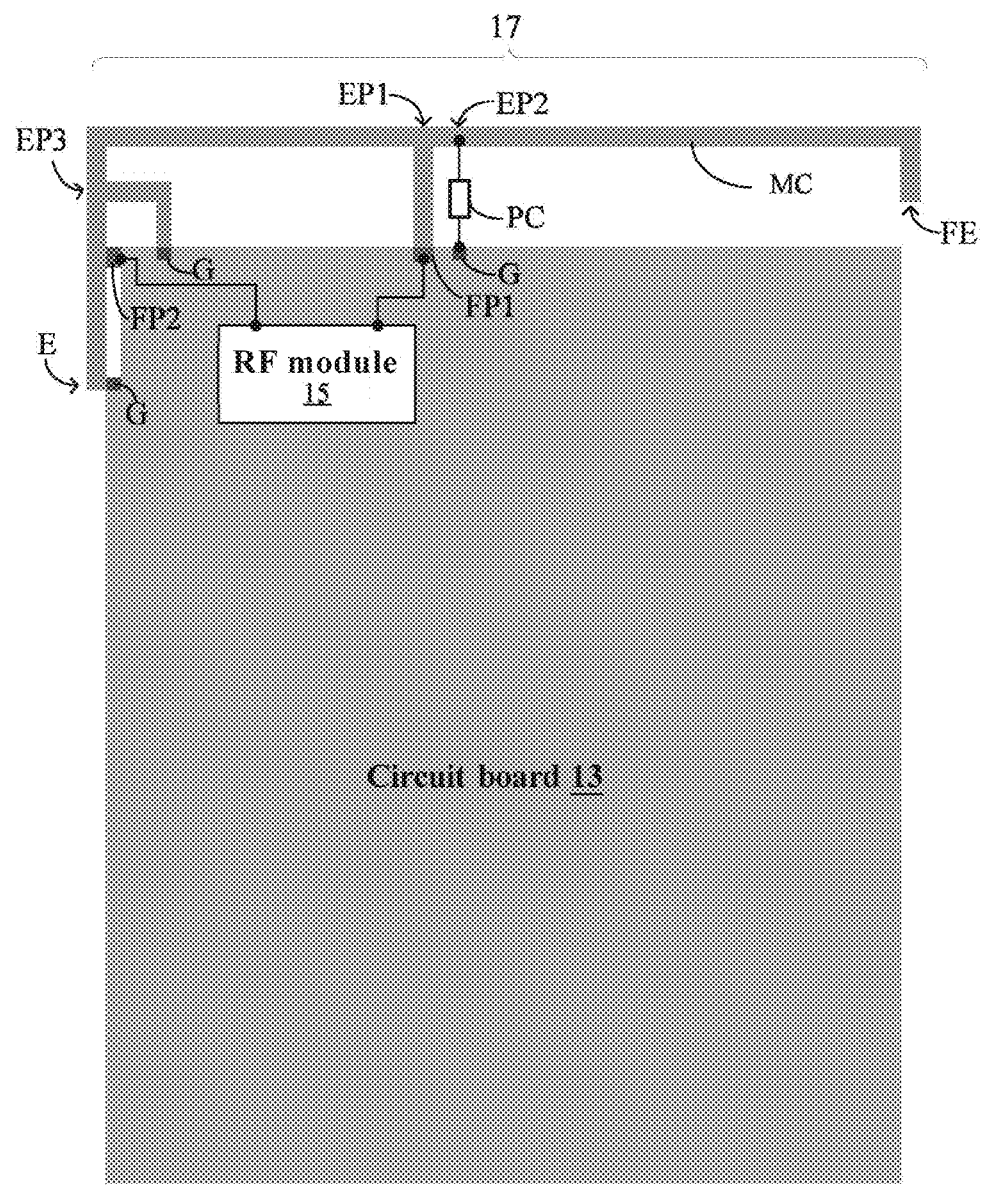
FIG. 9 is a schematic structural view of an antenna according to a seventh embodiment of the present invention.

Please refer to FIG. 9 for a seventh embodiment of the present invention. Similarly, to simplify the description, the housing 11 is omitted in FIG. 9, and FIG. 9 only focuses on structural features of the antenna 17. This embodiment differs from the fifth embodiment in that: the metal conductor MC further extends toward the longitudinal direction of the frame FM so that the free end FE thereof is located at a longitudinal side of the frame FM.

In this case, the antenna 17 also has a low frequency resonant path from the first feeding point FP1 to the free end FE of the metal conductor MC, which is equivalent to a quarter of a wavelength of a low frequency operation frequency (e.g., 700 MHz). Meanwhile, the antenna 17 also has a first middle frequency resonant path from the first feeding point FP1 to the ground terminal G to which the third extension point EP3 is extendedly coupled, and the first middle frequency resonant path is equivalent to a half of a wavelength of a first middle frequency operation frequency (e.g., 1710 MHz). The antenna 17 also has a second middle frequency resonant path from the first feeding point FP1 to the free end FE of the metal conductor MC, which is equivalent to three quarters of a wavelength of a second middle frequency operation frequency (e.g., 2170 MHz). Moreover, the antenna 17 also has a high frequency resonant path from the second feeding point FP2 to the endpoint E of the metal conductor MC, to the ground terminal G to which the third extension point EP3 is extendedly coupled and to the ground terminal G to which the second extension point EP2 is extendedly coupled, and the high frequency resonant path is equivalent to a half of a wavelength of a high frequency operation frequency (e.g., 2300 MHz).

It shall be appreciated that, the low frequency resonant path, the first middle frequency resonant path, the second middle frequency resonant path and the high frequency resonant path of the antenna 17 of this embodiment shall be appreciated by those of ordinary skill in the art based on the above descriptions, and thus are omitted from depiction in the drawings. Moreover, as shall also be appreciated by those of ordinary skill in the art, the aforesaid relationships between the resonant paths and the operation frequencies refer to equivalent relationships instead of complete equality in length of physical structures, and the equivalence in length of the structures may be adjusted in combination of other suitable passive components through impedance matching.

Moreover, in other embodiments, the mobile communication device 1 may also add the SP4T switch SW1 and/or the switch SW2 to the antenna 17 so that the operation frequency of the antenna is adjustable and the impedance matching effect is further improved, as described in the sixth embodiment. The implementation where the SP4T switch SW1 and/or the switch SW2 is added shall be readily appreciated by those of ordinary skill in the art, and thus will not be further described herein.

Figure 10A:
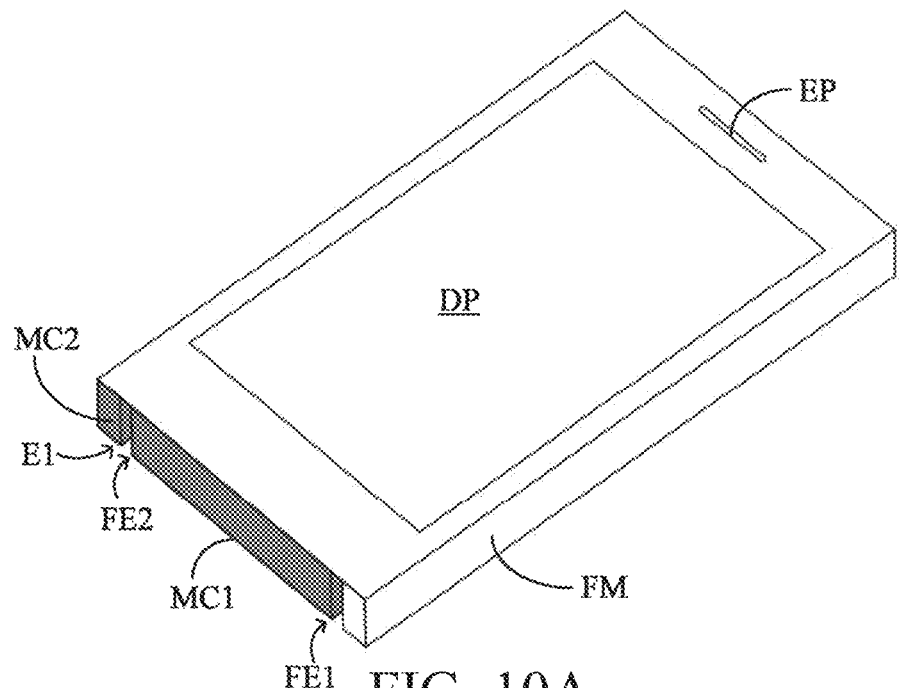
FIG. 10A is a schematic front view of a finished product of the mobile communication device 1 according to an eighth embodiment of the present invention.
Figure 10B:
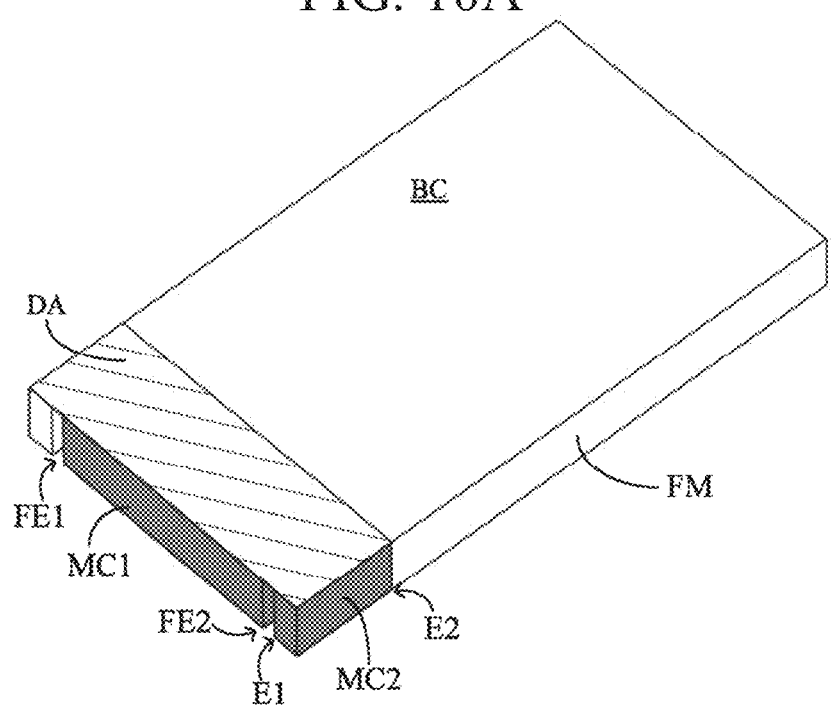
FIG. 10B is a schematic back view of the finished product of the mobile communication device 1 according to the eighth embodiment of the present invention.

Please refer to FIG. 10A and FIG. 10B for an eighth embodiment of the present invention, and FIG. 10A and FIG. 10B are schematic front and back views of a finished product of the mobile communication device 1 of the present invention. A front side of the finished product of the mobile communication device 1 is as shown in FIG. 10A, in which a screen DP, an earpiece EP and the frame FM are presented. Moreover, a back side of the finished product of the mobile communication device 1 is as shown in FIG. 10B, in which the back cover BC and the frame FM are presented. It shall be noted that, based on the principle of simplifying the description, other components of the mobile communication device 1 that can be presented on the front side, the back side or the frame FM and that are irrelevant to the present invention are omitted from depiction in the drawings. For example, as shall be appreciated by those of ordinary skill in the art, a front image capturing module (a front camera), a fingerprint identification module or the like may be presented on the front side, a rear image capturing module (a rear camera) may be configured on the back side, and a charge interface, a power switch or the like may be configured on the frame FM, but it is not limited thereto.

In this embodiment, the antenna 17 is disposed at the bottom of the mobile communication device 1, i.e., disposed at a place near to a microphone (not shown), so the first metal conductor MC1 and the second metal conductor MC2 are formed by two parts of the frame FM respectively. The first free end FE1 and the second free end FE2 of the first metal conductor MC1 form two breaks of the frame FM respectively at the lower portion of the frame FM. However, in other embodiments, the antenna 17 may also be disposed at the top of the mobile communication device 1, i.e., disposed at a place near to the earpiece, so that the first free end FE1 and the second free end FE2 of the first metal conductor MC1 form two breaks of the frame FM respectively at the upper portion of the frame FM. The implementation of the present invention where the antenna 17 is disposed at the top of the mobile communication device 1 shall be appreciated by those of ordinary skill in the art based on the above description, and thus will not be further described herein.

In this embodiment, the slash part DA of the back cover BC is made of a non-metal material, and other parts except for the slash part DA may be made of a metal or non-metal material, as described in the first embodiment. In other words, the slash part DA of the clearance area is made of a non-metal material to avoid influence on the performance of the antenna 17, while other parts except for the slash part DA may be made of a metal or non-metal material. Moreover, the breaks may be filled with any insulating substance to increase the look and the feel of the device.

Figure 11A:
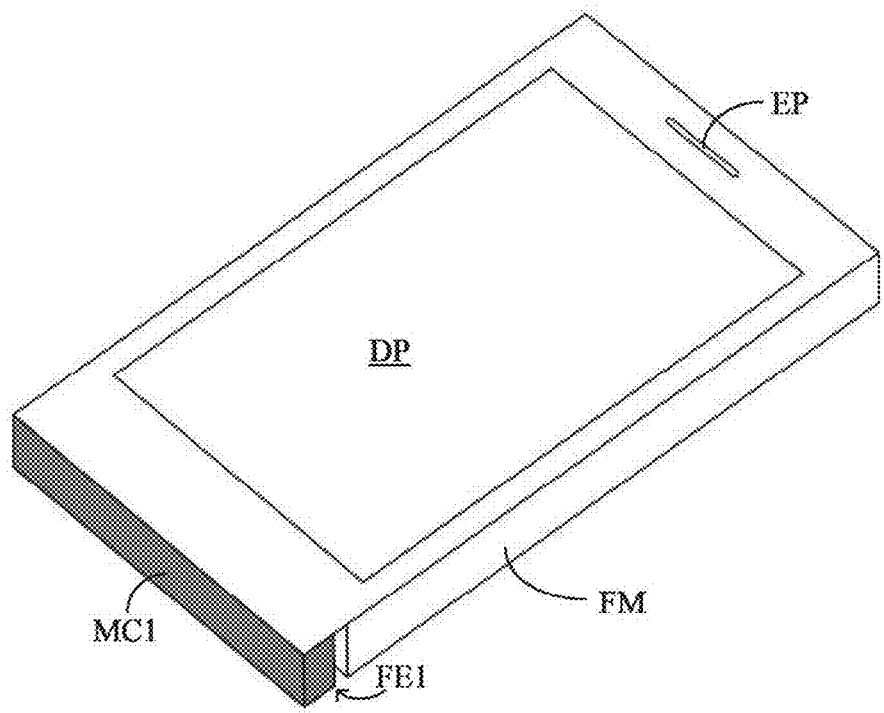
FIG. 11A is a schematic front view of a finished product of the mobile communication device 1 according to a ninth embodiment of the present invention.
Figure 11B:
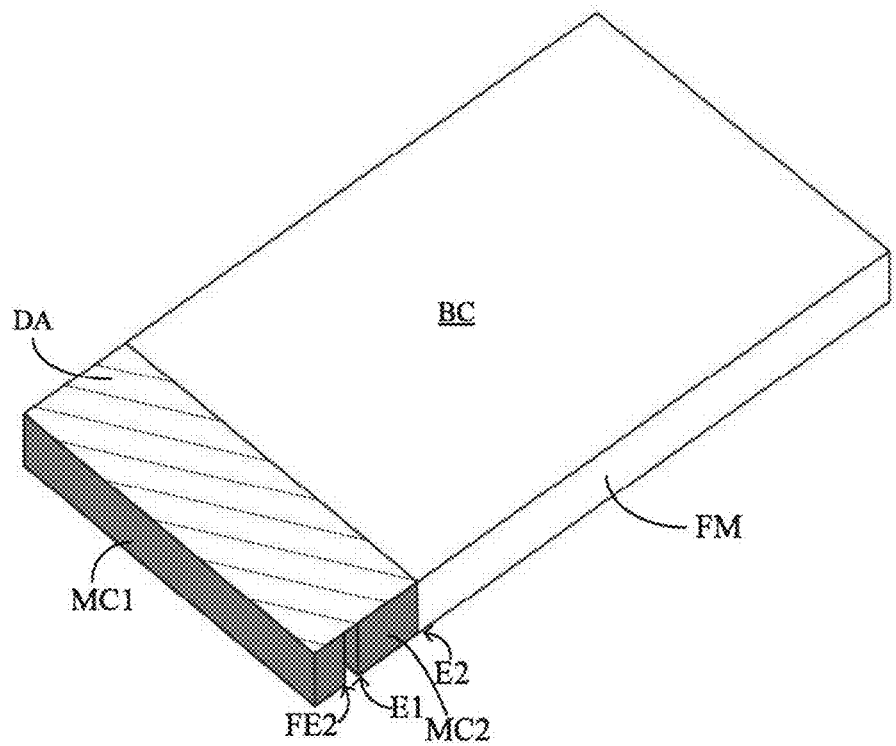
FIG. 11B is a schematic back view of the finished product of the mobile communication device 1 according to the ninth embodiment of the present invention.

Please refer to FIG. 11A and FIG. 11B for a ninth embodiment of the present invention, and FIG. 11A and FIG. 11B are schematic front and back views of a finished product of the mobile communication device 1 of the present invention. Similarly, a front side of the finished product of the mobile communication device 1 is as shown in FIG. 11A, in which a screen DP, an earpiece EP and the frame FM are presented. Moreover, a back side of the finished product of the mobile communication device 1 is as shown in FIG. 11B, in which the back cover BC and the frame FM are presented.

Similarly, In this embodiment, the antenna 17 is disposed at the bottom of the mobile communication device 1, i.e., disposed at a place near to a microphone (not shown), so the first metal conductor MC1 and the second metal conductor MC2 are formed by two parts of the frame FM respectively. However, this embodiment differs from the eighth embodiment in that: two breaks of the frame FM formed by the first free end FE1 and the second free end FE2 of the first metal conductor MC1 are respectively formed at a left portion and a right portion of the frame FM.

Figure 12A:
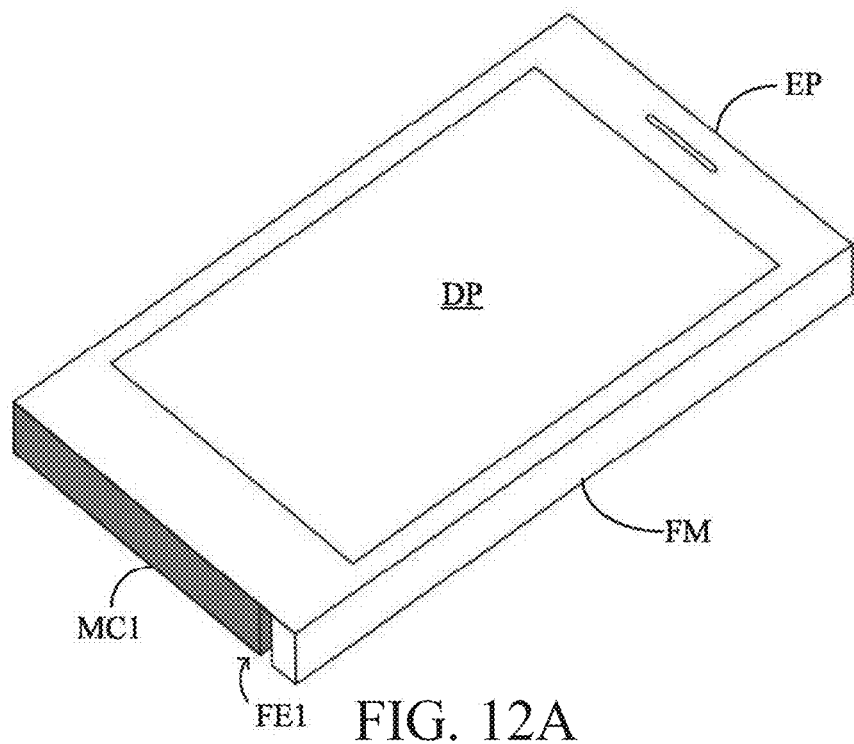
FIG. 12A is a schematic front view of a finished product of the mobile communication device 1 according to a tenth embodiment of the present invention.
Figure 12B:
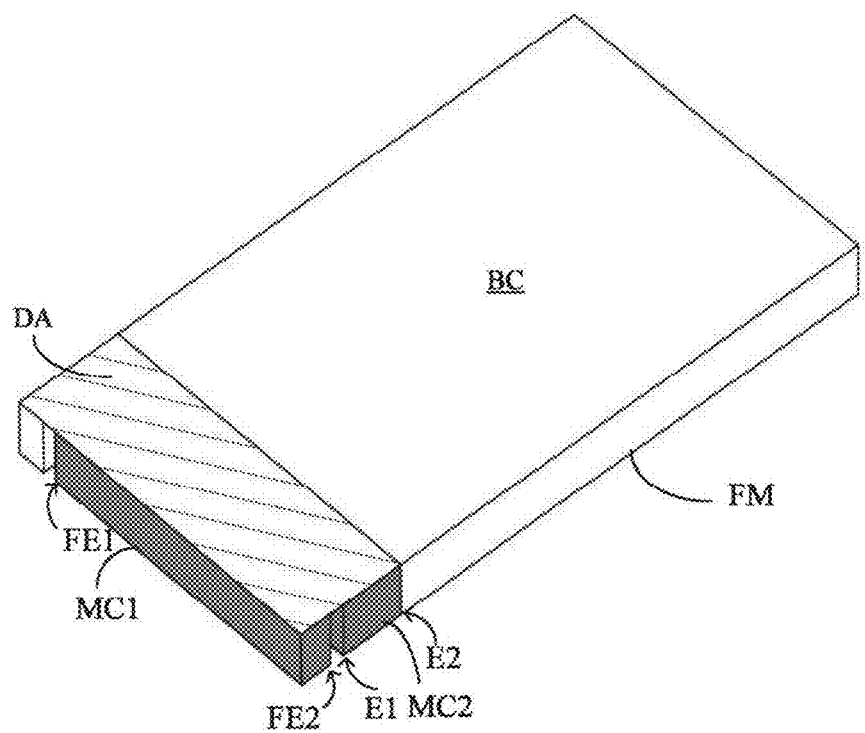
FIG. 12B is a schematic back view of the finished product of the mobile communication device 1 according to the tenth embodiment of the present invention.

Please refer to FIG. 12A and FIG. 12B for a tenth embodiment of the present invention, and FIG. 12A and FIG. 12B are schematic front and back views of a finished product of the mobile communication device 1 of the present invention. Similarly, a front side of the finished product of the mobile communication device 1 is as shown in FIG. 12A, in which a screen DP, an earpiece EP and the frame FM are presented. Moreover, a back side of the finished product of the mobile communication device 1 is as shown in FIG. 12B, in which the back cover BC and the frame FM are presented.

Similarly, In this embodiment, the antenna 17 is disposed at the bottom of the mobile communication device 1, i.e., disposed at a place near to a microphone (not shown), so the first metal conductor MC1 and the second metal conductor MC2 are formed by two parts of the frame FM respectively. However, this embodiment differs from the eighth embodiment and the ninth embodiment in that: two breaks of the frame FM formed by the first free end FE1 and the second free end FE2 of the first metal conductor MC1 are respectively formed at a right portion and a lower portion of the frame FM (with reference to the front side of the mobile communication device 1).

As described previously, in other embodiments, the antenna 17 may also be disposed at the top of the mobile communication device 1, i.e., disposed at a place near to the earpiece, so that the first free end FE1 and the second free end FE2 of the first metal conductor MC1 respectively form two breaks of the frame FM at a left portion and an upper portion of the frame FM respectively. The implementation of the present invention where the antenna 17 is disposed at the top of the mobile communication device 1 shall be appreciated by those of ordinary skill in the art based on the above description, and thus will not be further described herein.

Figure 13A:
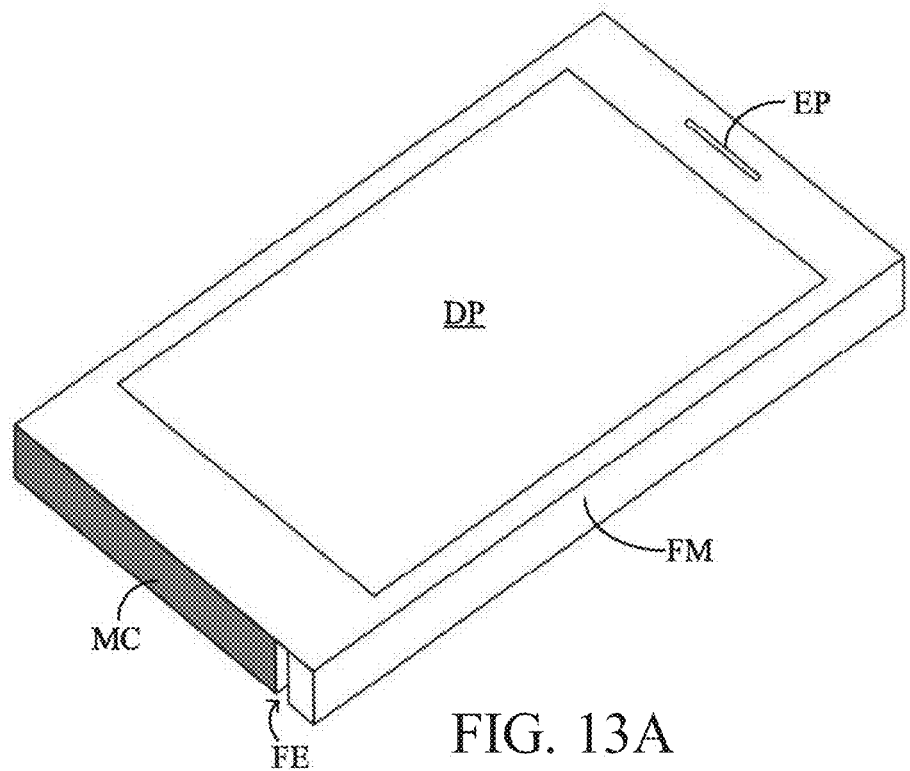
FIG. 13A is a schematic front view of a finished product of the mobile communication device 1 according to an eleventh embodiment of the present invention.
Figure 13B:
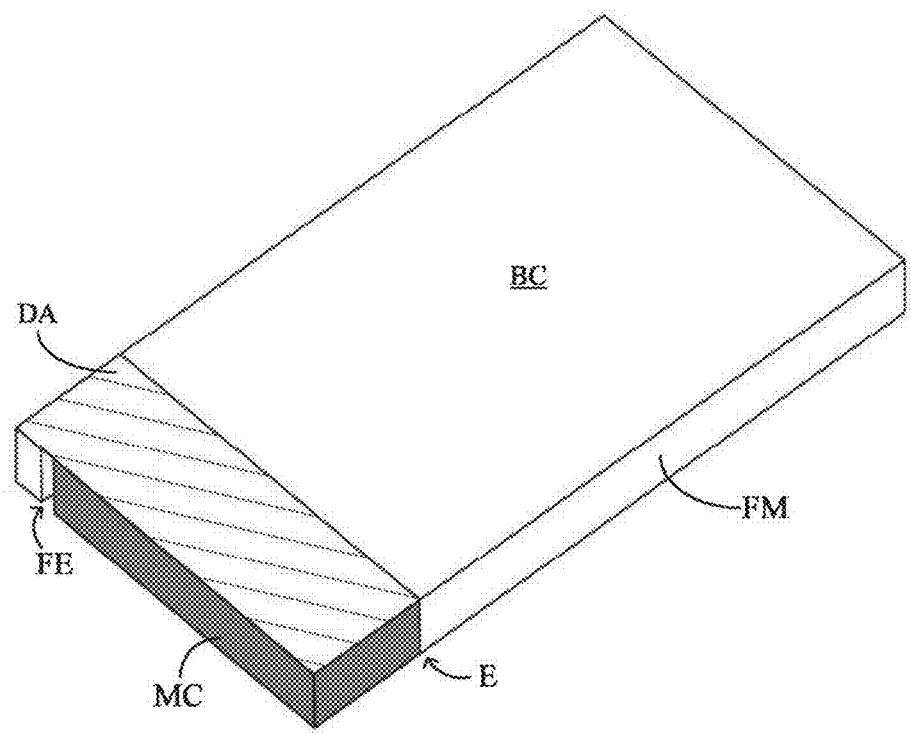
FIG. 13B is a schematic back view of the finished product of the mobile communication device 1 according to the eleventh embodiment of the present invention.

Please refer to FIG. 13A and FIG. 13B for an eleventh embodiment of the present invention, and FIG. 13A and FIG. 13B are schematic front and back views of a finished product of the mobile communication device 1 of the present invention. Similarly, a front side of the finished product of the mobile communication device 1 is as shown in FIG. 13A, in which a screen DP, an earpiece EP and the frame FM are presented. Moreover, a back side of the finished product of the mobile communication device 1 is as shown in FIG. 13B, in which the back cover BC and the frame FM are presented.

Similarly, in this embodiment, the antenna 17 is disposed at the bottom of the mobile communication device 1, i.e., disposed at a place near to a microphone (not shown), so the metal conductor MC is formed by a part of the frame FM. A break of the frame FM formed by the free end FE of the metal conductor MC is formed at a lower portion of the frame FM. However, in other embodiments, the antenna 17 may also be disposed at the top of the mobile communication device 1, i.e., disposed at a place near to the earpiece, so that the free end FE of the metal conductor MC forms a break of the frame FM at an upper portion of the frame FM. The implementation of the present invention where the antenna 17 is disposed at the top of the mobile communication device 1 shall be appreciated by those of ordinary skill in the art based on the above description, and thus will not be further described herein.

Figure 14A:
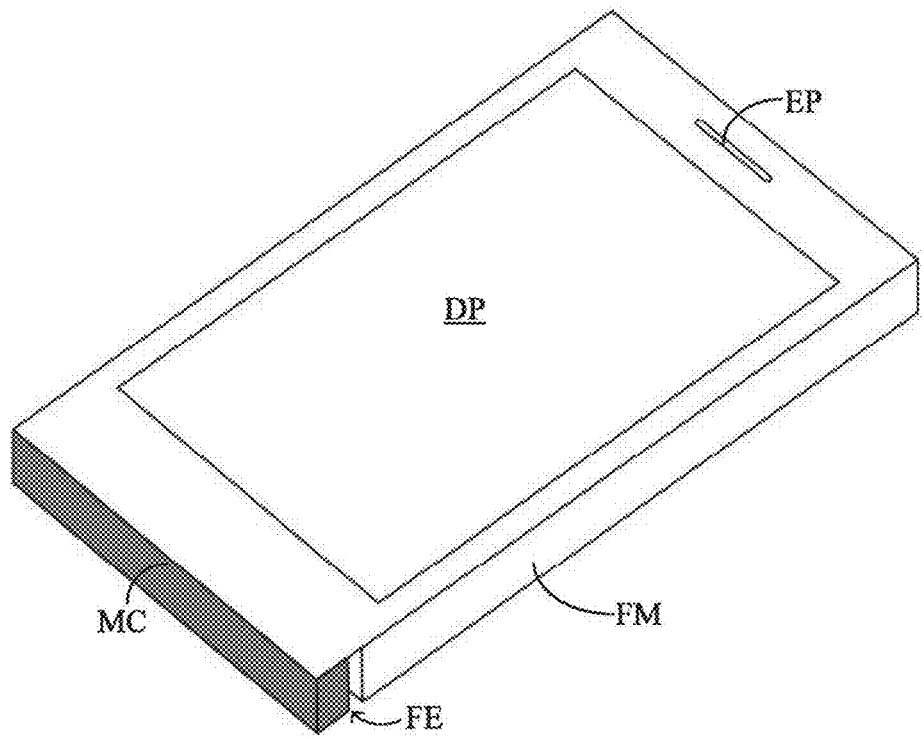
FIG. 14A is a schematic front view of a finished product of the mobile communication device 1 according to a twelfth embodiment of the present invention.
Figure 14B:
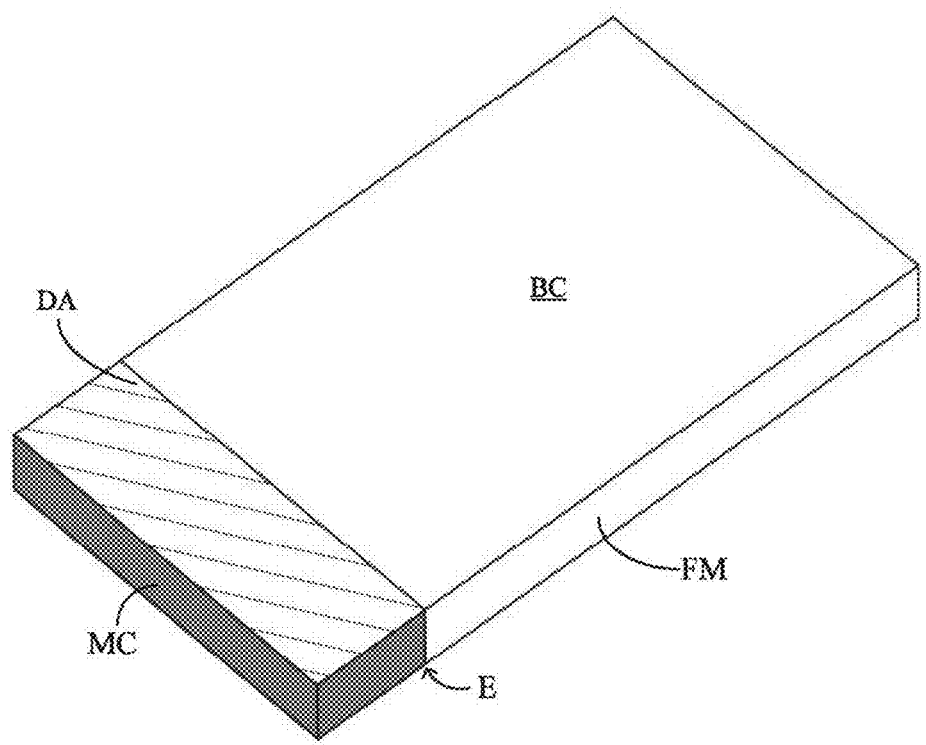
FIG. 14B is a schematic back view of the finished product of the mobile communication device 1 according to the twelfth embodiment of the present invention.

Please refer to FIG. 14A and FIG. 14B for a twelfth embodiment of the present invention, and FIG. 14A and FIG. 14B are schematic front and back views of a finished product of the mobile communication device 1 of the present invention. Similarly, a front side of the finished product of the mobile communication device 1 is as shown in FIG. 14A, in which a screen DP, an earpiece EP and the frame FM are presented. Moreover, a back side of the finished product of the mobile communication device 1 is as shown in FIG. 14B, in which the back cover BC and the frame FM are presented.

Similarly, in this embodiment, the antenna 17 is disposed at the bottom of the mobile communication device 1, i.e., disposed at a place near to a microphone (not shown), so the metal conductor MC is formed by a part of the frame FM. A break of the frame FM formed by the free end FE of the metal conductor MC is formed at a right portion of the frame FM (with reference to the front side of the mobile communication device 1). However, in other embodiments, the antenna 17 may also be disposed at the top of the mobile communication device 1, i.e., disposed at a place near to the earpiece, so that the free end FE of the metal conductor MC forms a break of the frame FM at a left portion of the frame FM. The implementation of the present invention where the antenna 17 is disposed at the top of the mobile communication device 1 shall be appreciated by those of ordinary skill in the art based on the above description, and thus will not be further described herein.

Figure 15A:
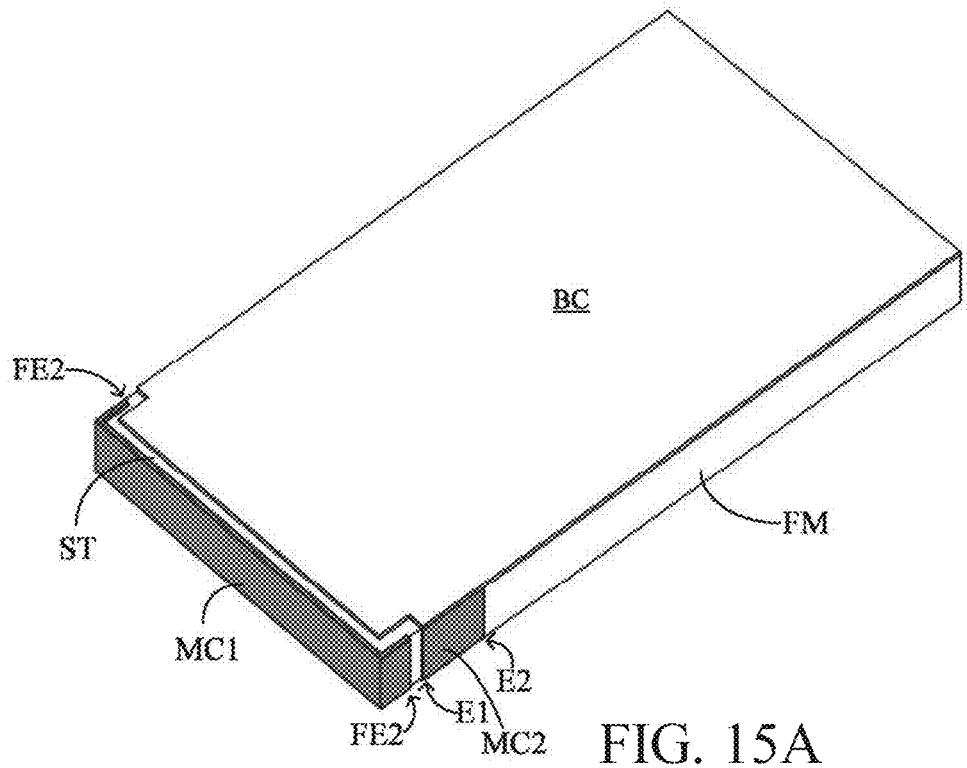
FIG. 15A to FIG. 15D are schematic views illustrating four implementations of the mobile communication device 1 according to a thirteenth embodiment of the present invention.
Figure 15B:
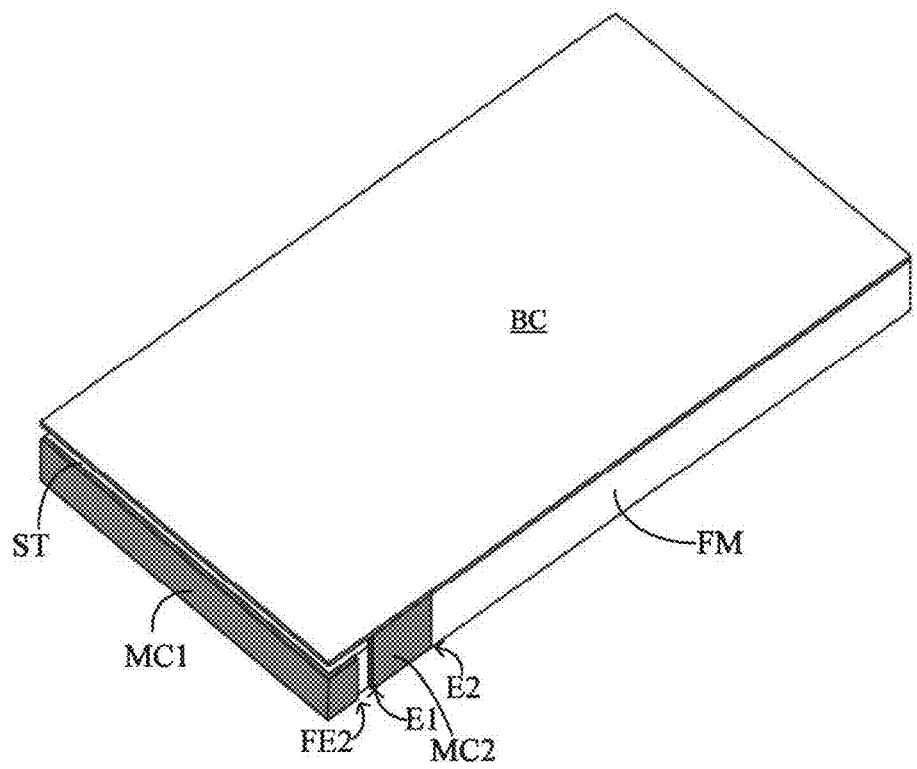

Please refer to FIG. 15A to FIG. 15D for a thirteenth embodiment of the present invention, and FIG. 15A to FIG. 15D respectively illustrate four implementations where the frame FM has two breaks and the back cover BC is a metal conductor as a whole. In FIG. 15A and FIG. 15B, the two breaks extend from the frame FM and across an edge of the back cover BC to connect with each other so that the first metal conductor MC1 is insulated from the back cover BC. In FIG. 15A, a slot ST formed by the connection of the two breaks is formed on the back cover BC, and in FIG. 15B, the slot ST formed by the connection of the two breaks is formed on the frame FM. Like the breaks, the slot ST may be filled with any insulating substance, thereby increasing the look and the feel of the device.

Figure 15C:
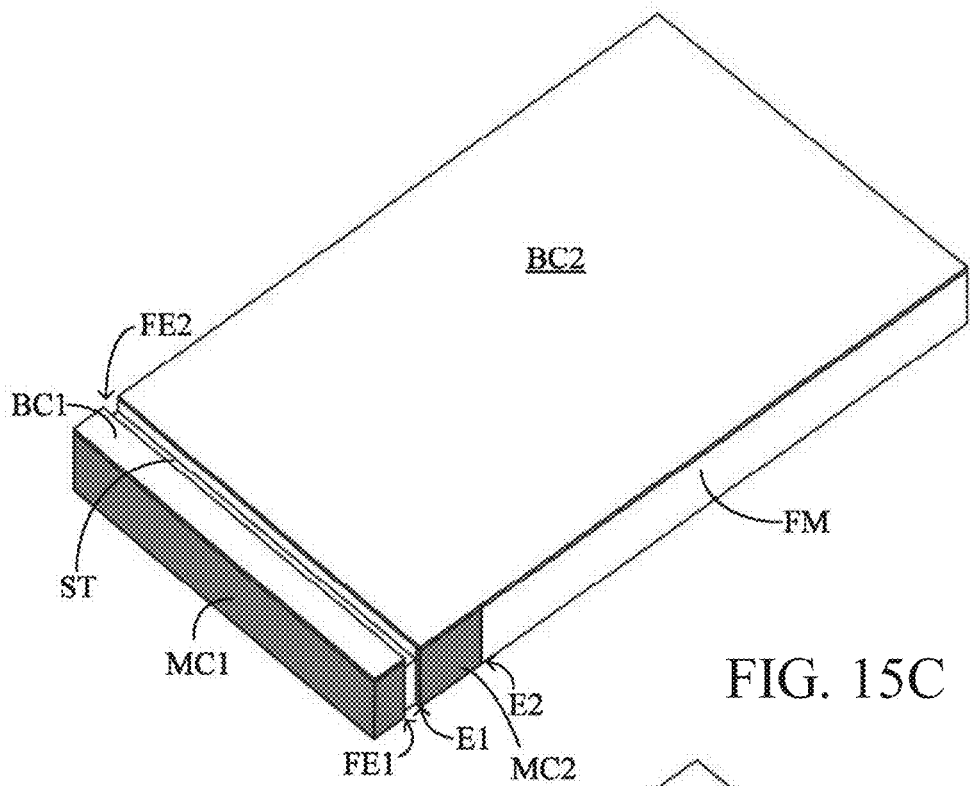
Figure 15D:
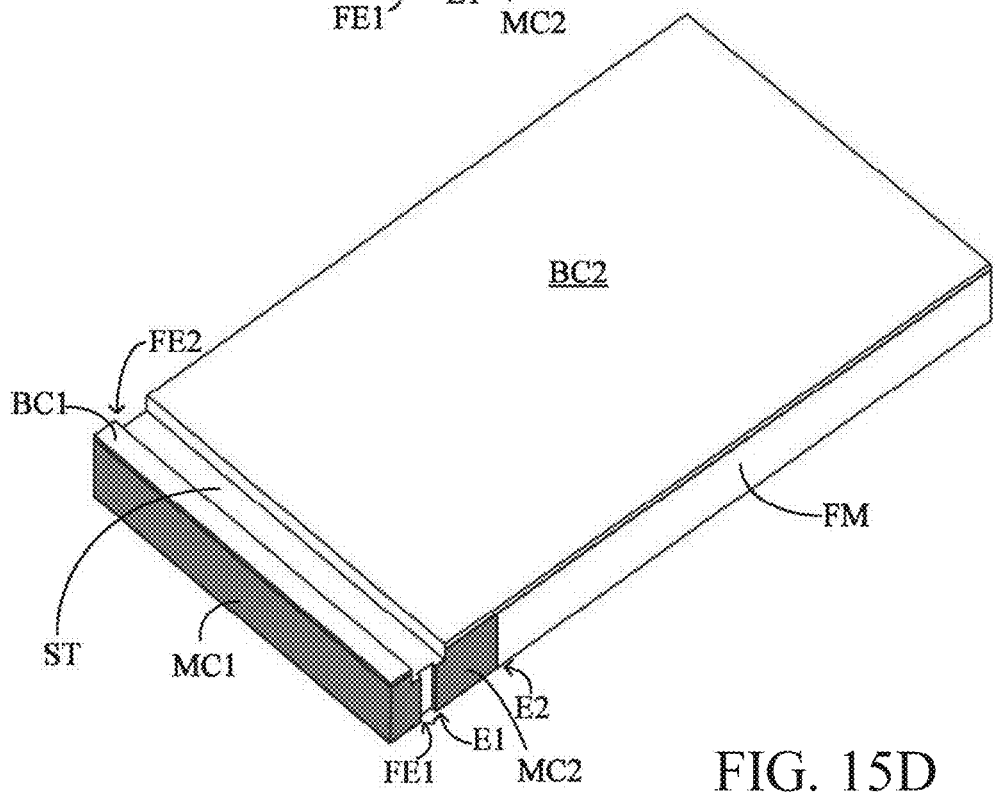

Moreover, in FIG. 15C and FIG. 15D, the two breaks extend from the frame FM and across a body of the back cover BC to connect with each other so as to divide the back cover BC into a first part BC1 and a second part BC2, and the first part BC1 makes contact with the first metal conductor MC1 and the second part BC2 is insulated from the first metal conductor MC2. In this case, the first part BC1 of the back cover BC may be regarded as an extension of the first metal conductor MC1 of the antenna 17 to serve as a radiating body. In FIG. 15C, the slot ST formed by the connection of the two breaks has the same width as that of the breaks of the frame FM, while in FIG. 15D, the slot ST formed by the connection of the two breaks has a width greater than that of the breaks of the frame FM.

As shall be readily appreciated by those of ordinary skill in the art, the shape of the slot ST formed by the connection of the two breaks is not limited to a straight strip in other embodiments. Therefore, a slot ST of any shape shall fall within the scope of the present invention as long as the slot ST can insulate the first metal conductor MC1 from the back cover BC or divide the back cover BC into the first part BC1 and the second part BC2.

Figure 16A:
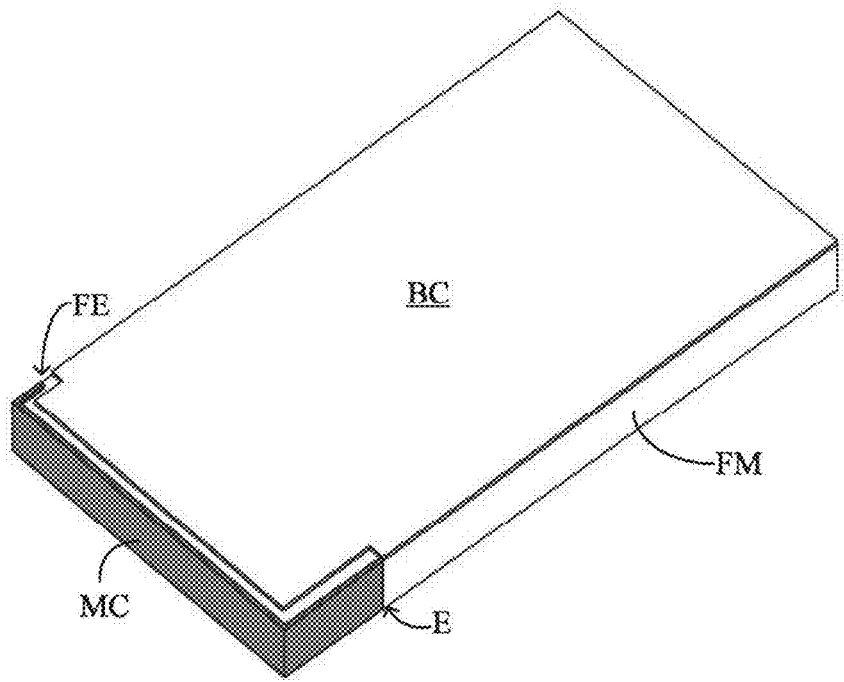
FIG. 16A to FIG. 16D are schematic views illustrating four implementations of the mobile communication device 1 according to a fourteenth embodiment of the present invention.
Figure 16B:
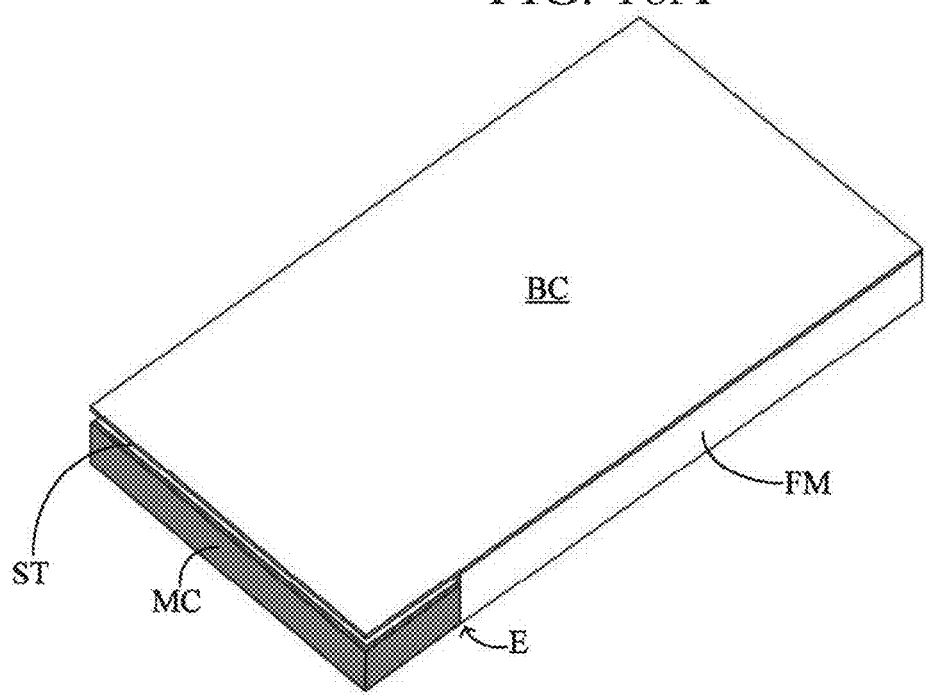

Please refer to FIG. 16A to FIG. 16D for a fourteenth embodiment of the present invention, and FIG. 16A to FIG. 16D respectively illustrate four implementations where the frame FM has a break and the back cover BC is a metal conductor as a whole. In FIG. 16A and FIG. 16B, the break extends from the frame FM and across an edge of the back cover BC to the endpoint E of the metal conductor MC so that the metal conductor MC is insulated from the back cover BC. In FIG. 16A, the slot ST formed by the extension of the break is formed on the back cover BC, and in FIG. 16B, the slot ST formed by the extension of the break is formed on the frame FM.

Figure 16C:
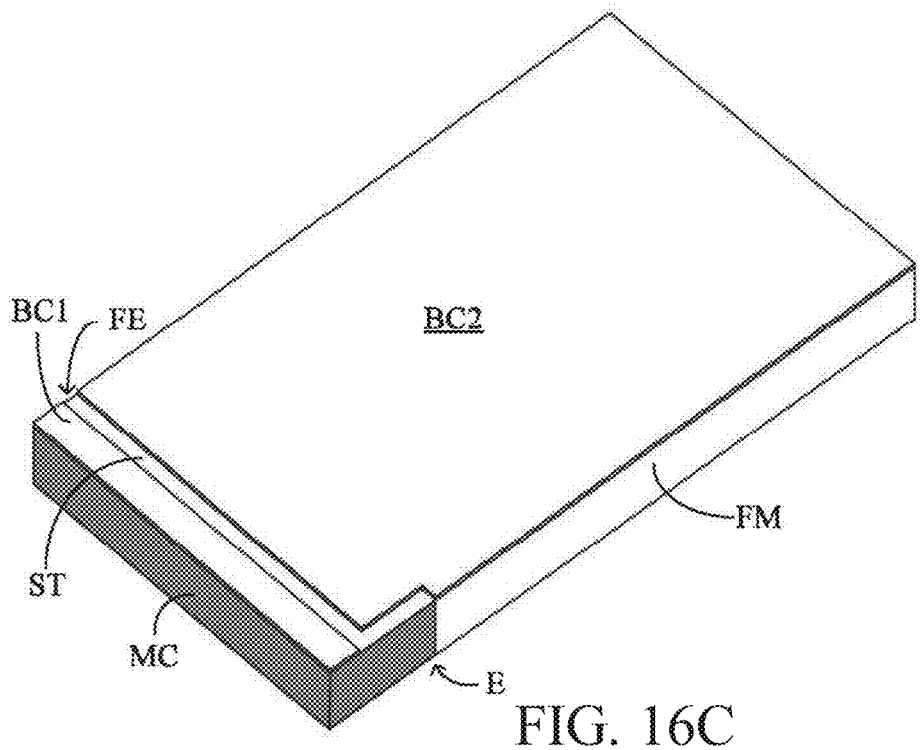
Figure 16D:
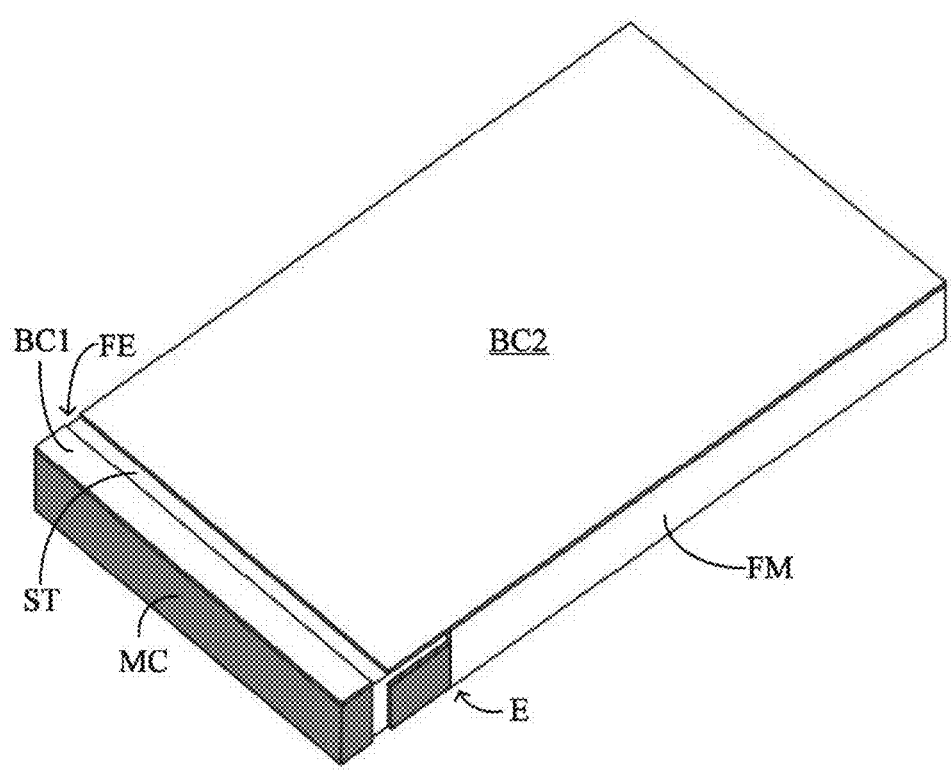

Moreover, in FIG. 16C and FIG. 16D, the break extends from the frame FM and across a body of the back cover BC to the endpoint E of the metal conductor MC so as to divide the back cover BC into a first part BC1 and a second part BC2, and the first part BC1 makes contact with the metal conductor MC and the second part BC2 is insulated from the metal conductor MC. In this case, the first part BC1 of the back cover BC may be regarded as an extension of the metal conductor MC of the antenna 17 to serve as a radiating body. In FIG. 16C, the slot ST formed by the extension of the break is formed on the back cover BC, and in FIG. 16D, the slot ST formed by the extension of the break is formed on the frame FM. Moreover, as shall also be appreciated by those of ordinary skill in the art, the width of the slot ST on the back cover BC may be greater than that of the break of the frame FM in FIG. 16C and FIG. 16D, i.e., similar to that of FIG. 15D.

As shall be readily appreciated by those of ordinary skill in the art, the shape of the slot ST formed by the extension of the break is not limited to a straight strip in other embodiments. Therefore, a slot ST of any shape shall fall within the scope of the present invention as long as the slot ST can insulate the metal conductor MC from the back cover BC or divide the back cover BC into the first part BC1 and the second part BC2.

According to the above descriptions, the present invention provides an antenna design with multiple feeding sources, which is capable of feeding multiple radio frequency (RF) signal sources to a same antenna physical structure to share an antenna clearance area and save the space occupied by the antenna within the wireless communication device, and is capable of utilizing a suitable physical structural design to achieve a high isolation among multiple RF signal resources and a high radiant efficiency. Moreover, the antenna architecture of the present invention may achieve the same radiant effect in combination with the metal frame, and may also add active components to optimize impedance matching and increase the real-time adjustability of the operation frequency band.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A wireless communication device, comprising:
   a circuit board, having a ground terminal, a first feeding point and a second feeding point;
   a radio frequency (RF) module, being disposed on the circuit board and coupled to the first feeding point and the second feeding point; and
   an antenna, for transmitting and receiving an RF signal, the antenna comprising:
      a first metal conductor, connecting to the first feeding point and extending toward a first direction;
      a second metal conductor, connecting to the second feeding point and extending toward a second direction orthogonal to the first direction; and
      an extension metal piece, connecting the first metal conductor to the second metal conductor to extend at least one of a plurality of resonant paths of the antenna;
      wherein the first metal conductor and the second metal conductor are formed on a surface of a carrier plate in the form of a plane metal layer, and the extension metal piece is formed on an opposite surface of the carrier plate.

2. The wireless communication device of claim 1, further comprising a housing, wherein the housing has a frame and a back cover to define a receiving space, the circuit board is disposed in the receiving space and defines a clearance area from the housing, and the antenna is disposed in the clearance area.

3. The wireless communication device of claim 2, wherein the first direction is defined by a shortest side of the frame, the second direction is defined by the longest side of the frame, the first metal conductor has a first free end and a second free end, the first metal conductor is extendedly coupled from a first extension point between the first free end and the second free end to the first feeding point, and the first metal conductor is coupled from a second extension point between the first extension point and the second free end to the ground terminal via a passive component;
   wherein the second metal conductor has a first endpoint adjacent to the second free end of the first metal conductor and a second endpoint away from the second free end of the first metal conductor, the second metal conductor is extendedly coupled from the first endpoint to the ground terminal and from the second endpoint to the ground terminal respectively, and the second metal conductor is coupled from between the first endpoint and the second endpoint to the second feeding point.

4. The wireless communication device of claim 3, wherein the extension metal piece coupled between the second free end of the first metal conductor and the first endpoint of the second metal conductor, and the resonant paths includes a low frequency resonant path, a first middle frequency resonant path, a second middle frequency resonant path, and a high frequency resonant path;

wherein the low frequency resonant path starts from the first feeding point to the first free end of the first metal conductor, the first middle frequency resonant path starts from the first feeding point via the extension metal piece to the ground terminal to which the first endpoint of the second metal conductor is extendedly coupled, the second middle frequency resonant path starts from the first feeding point to the first free end of the first metal conductor, and the high frequency resonant path starts from the second feeding point to the second endpoint of the second metal conductor, to the ground terminal to which the first endpoint is extendedly coupled, and via the extension metal piece to the ground terminal to which the second extension point of the first metal conductor is extendedly coupled.

5. The wireless communication device of claim 4, wherein the low frequency resonant path is equivalent to a quarter of a wavelength of a low frequency operation frequency, the first middle frequency resonant path is equivalent to a half of a wavelength of a first middle frequency operation frequency, the second middle frequency resonant path is equivalent to three quarters of a wavelength of a second middle frequency operation frequency, and the high frequency resonant path is equivalent to a half of a wavelength of a high frequency operation frequency.

6. The wireless communication device of claim 4, further comprising:
a switch, being configured to selectively couple the extension metal piece to the ground terminal via an another passive component to adjust a first middle frequency operation frequency and a high frequency operation frequency.

7. The wireless communication device of claim 3, wherein the first extension point and the second extension point are overlapped on the first metal conductor.

8. The wireless communication device of claim 3, further comprising:
a single-pole-four-throw (SP4T) switch, being configured to selectively couple an adjustment point between the first extension point of the first metal conductor and the first free end to the ground terminal via an another passive component to adjust the low frequency operation frequency and the second middle frequency operation frequency.

9. The wireless communication device of claim 3, wherein the first metal conductor and the second metal conductor are formed by two parts of the frame respectively, and the first free end and the second free end of the first metal conductor form two breaks of the frame respectively.

10. The wireless communication device of claim 9, wherein the second metal conductor further extends toward the first direction, and the two breaks are formed in one of an upper portion and a lower portion of the frame respectively.

11. The wireless communication device of claim 9, wherein the first metal conductor further extends toward the second direction, and the two breaks are formed in a left portion and a right portion of the frame respectively.

12. The wireless communication device of claim 11, wherein the back cover is of a metal material, and the two breaks extend from the frame and across an edge of the back cover to connect with each other so that the first metal conductor is insulated from the back cover.

13. The wireless communication device of claim 11, wherein the back cover is of a metal material, and the two breaks extend from the frame and across a body of the back cover to connect with each other so as to divide the back cover into a first part and a second part, the first part makes contact with the first metal conductor and the second part is insulated from the first metal conductor.

14. The wireless communication device of claim 9, wherein the first metal conductor further extends toward the second direction, and one of the two breaks is formed in one of a left portion and a right portion of the frame, and the other of the two breaks is formed in one of an upper portion and a lower portion of the frame.

* * * * *